(12) United States Patent
Lee

(10) Patent No.: US 12,393,302 B2
(45) Date of Patent: Aug. 19, 2025

(54) DISPLAY DEVICE

(71) Applicant: Samsung Display Co., Ltd., Yongin-Si (KR)

(72) Inventor: Choon Hyop Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/675,138

(22) Filed: May 28, 2024

(65) Prior Publication Data

US 2025/0147624 A1    May 8, 2025

(30) Foreign Application Priority Data

Nov. 2, 2023  (KR) .......................... 10-2023-0149561

(51) Int. Cl.
*G06F 3/041*  (2006.01)
*G06F 3/044*  (2006.01)

(52) U.S. Cl.
CPC ...... *G06F 3/041662* (2019.05); *G06F 3/0446* (2019.05); *G06F 2203/04111* (2013.01)

(58) Field of Classification Search
CPC ............. G06F 3/041662; G06F 3/0446; G06F 2203/04111
See application file for complete search history.

(56) References Cited

U.S. PATENT DOCUMENTS 11,073,895 B2 * 7/2021 Park ....................... G06F 3/0446
11,132,081 B2   9/2021 Lee et al.
11,650,697 B1 * 5/2023 Jeong ................... G06F 3/04182
                                                345/174
11,740,751 B2   8/2023 Kim et al.
11,809,661 B2  11/2023 Lee
12,248,642 B2 * 3/2025 Lee ....................... G06F 3/04166
(Continued)

FOREIGN PATENT DOCUMENTS

KR   10-2021-0034202 A    3/2021
KR   10-2022-0138506 A   10/2022
(Continued)

*Primary Examiner* — Amy Onyekaba
(74) *Attorney, Agent, or Firm* — Innovation Counsel LLP

(57) ABSTRACT

A display device is disclosed that includes a sensor area including a plurality of channels each including touch electrodes arranged in a column, a peripheral area located around the sensor area and including touch lines connected to the channels, and a display driver configured to supply touch driving signals to the channels. The sensor area includes a first sensor area located at a first edge of the sensor area, and a second sensor area located adjacent to the first sensor area. The display driver supplies first touch driving signals having a first voltage level to the channels in the first sensor area during a first period, and supplies second touch driving signals having a second voltage level to the channels in the second sensor area during a second period after the first period, the second voltage level being lower than the first voltage level. The display driver supplies the first touch driving signals sequentially to the channels in the first sensor area according to a single-channel driving scheme during the first period, and supplies the second touch driving signals simultaneously to the channels in the second sensor area according to a multi-channel driving scheme during the second period.

20 Claims, 14 Drawing Sheets

(56) References Cited

U.S. PATENT DOCUMENTS

| | | | |
|---|---|---|---|
| 2013/0342770 A1* | 12/2013 | Kim | G06F 3/0443 |
| | | | 349/12 |
| 2017/0075485 A1* | 3/2017 | Takeuchi | G02F 1/13338 |
| 2019/0095032 A1* | 3/2019 | Park | G06F 1/3262 |
| 2019/0171331 A1* | 6/2019 | Gray | G06F 3/04162 |
| 2020/0026383 A1* | 1/2020 | Hwang | G06F 3/04184 |
| 2020/0133467 A1* | 4/2020 | Kim | G06F 3/0445 |
| 2021/0043693 A1* | 2/2021 | Kim | A61B 5/6898 |
| 2021/0072862 A1* | 3/2021 | Jeong | G06F 3/0412 |
| 2022/0276760 A1* | 9/2022 | Lee | G06F 3/04184 |
| 2023/0061354 A1* | 3/2023 | Park | H03F 3/70 |
| 2023/0112523 A1* | 4/2023 | Cho | G06F 3/0412 |
| | | | 345/174 |
| 2023/0176687 A1 | 6/2023 | Seo | |
| 2024/0049534 A1* | 2/2024 | Shin | G06F 3/0446 |

FOREIGN PATENT DOCUMENTS

| | | |
|---|---|---|
| KR | 10-2486407 B1 | 1/2023 |
| KR | 10-2023-0046341 A | 4/2023 |

\* cited by examiner

DU: SUB, TFTL, EDL, TFEL

DISPLAY DEVICE

This application claims priority from Korean Patent Application No. 10-2023-0149561 filed on Nov. 2, 2023, in the Korean Intellectual Property Office, the disclosure of which is incorporated herein by reference in its entirety.

BACKGROUND

1. Field of the Disclosure

The present disclosure relates to a display device.

2. Description of the Related Art

As the information-oriented society evolves, various demands for display devices are ever increasing. For example, display devices are being employed by a variety of electronic devices such as smart phones, digital cameras, laptop computers, navigation devices, and smart televisions. Display devices include flat panel display devices such as a liquid-crystal display device, a field emission display device, and an organic light-emitting display device. Among such flat panel display devices, a light-emitting display device includes a light-emitting element that can emit light on its own, so that each of the pixels of the display panel can emit light by themselves. Accordingly, a light-emitting display device can display images without a backlight unit that supplies light to the display panel.

Recently, a touch sensing unit that recognizes a touch input has been widely employed as the input means of a display device for a smartphone or a tablet PC. The touch sensing unit determines whether a user's touch input is received, and, if any, finds the coordinates of the position of the touch input.

SUMMARY

Aspects of the present disclosure may provide a display device that can improve touch sensitivity by uniformly adjusting sensing signals of unit sensing areas even though some touch electrodes are formed smaller.

According to an embodiment, a display device comprises a sensor area comprising a plurality of channels each comprising touch electrodes arranged in a column, a peripheral area located around the sensor area and comprising touch lines connected to the channels, and a display driver configured to supply touch driving signals to the channels. The sensor area comprises a first sensor area located at a first edge of the sensor area, and a second sensor area located adjacent to the first sensor area. The display driver supplies first touch driving signals having a first voltage level to the channels in the first sensor area during a first period, and supplies second touch driving signals having a second voltage level to the channels in the second sensor area during a second period after the first period, the second voltage level being lower than the first voltage level. The display driver supplies the first touch driving signals sequentially to the channels in the first sensor area according to a single-channel driving scheme during the first period, and supplies the second touch driving signals simultaneously to the channels in the second sensor area according to a multi-channel driving scheme during the second period.

The sensor area may have a circular or oval shape in a plan view.

The sensor area may further comprises a third sensor area at a second edge of the sensor area. The display driver may supply third touch driving signals having the first voltage level to the channels in the third sensor areas according to the single-channel driving scheme during a third period after the second period.

A pulse width of each of the touch driving signals supplied during the first period may be smaller than a pulse width of each of the touch driving signals supplied during the second period.

A size of some of the touch electrodes disposed in the first sensor area may be smaller than a size of some of the touch electrodes disposed in the second sensor area.

The display device may further comprise a voltage level output unit configured to determine the first voltage level or the second voltage level of the touch driving signals. The voltage level output unit may comprise first and second charge pumps each comprising at least one capacitor, a plurality of amplifiers associated with the plurality of channels, respectively, a first switch disposed between the first and second charge pumps, a second switch disposed between the second charge pump and the plurality of amplifiers, and a third switch disposed between the first charge pump and the plurality of amplifiers.

The voltage level output unit may output an output voltage of the first voltage level by connecting the first and second charge pumps in series by turning on the first and second switches.

The voltage level output unit may output an output voltage of the second voltage level by connecting the first and second charge pumps in parallel by turning on the second and third switches.

The touch electrodes may comprises a plurality of driving electrodes electrically connected in a first direction in the sensor area, and a plurality of sensing electrodes electrically connected in a second direction crossing the first direction in the sensor area. The display driver may supply the touch driving signals to the plurality of driving electrodes and may receive touch sensing signals from the plurality of sensing electrodes during a mutual capacitance period.

The display driver may supply the touch driving signals to the plurality of driving electrodes and may receive the touch sensing signals from the plurality of driving electrodes during a first self-capacitance period after the mutual capacitance period.

The display driver may supply the touch driving signals to the plurality of sensing electrodes and may receive the touch sensing signals from the plurality of sensing electrodes during a second self-capacitance period after the first self-capacitance period.

According to an embodiment, a display device comprises a sensor area comprising a plurality of channels each comprising touch electrodes arranged in a column, and a hole surrounded by some of the channels, a peripheral area located around the sensor area and comprising touch lines connected to the channels, and a display driver configured to supply touch driving signals to the channels. The display driver supplies first touch driving signals having a first voltage level to first channels that are directly adjacent to the hole during a first period, and supplies second touch driving signals having a second voltage level to the channels that are not adjacent to the hole during a second period after the first period, the second voltage level being lower than the first voltage level. The display driver supplies the first touch driving signals sequentially to the first channels according to a single-channel driving scheme during the first period, and supplies the second touch driving signals simultaneously to the second channels according to a multi-channel driving scheme during the second period.

A pulse width of each of the first touch driving signals supplied during the first period may be smaller than a pulse width of each of the second touch driving signals supplied during the second period.

A size of the touch electrodes directly adjacent to the hole may be smaller than a size of the touch electrodes not adjacent to the hole.

The display device may further comprise a voltage level output unit configured to determine the first voltage level or the second voltage level of the touch driving signals. The voltage level output unit may comprise first and second charge pumps each comprising at least one capacitor, a plurality of amplifiers associated with the plurality of channels, respectively, a first switch disposed between the first and second charge pumps, a second switch disposed between the second charge pump and the plurality of amplifiers, and a third switch disposed between the first charge pump and the plurality of amplifiers.

The voltage level output unit may output an output voltage of the first voltage level by connecting the first and second charge pumps in series in case that the first and second switches are turned on.

The voltage level output unit may output an output voltage of the second voltage level by connecting the first and second charge pumps in parallel in case that the second and third switches are turned on.

The touch electrodes may comprise a plurality of driving electrodes electrically connected in a first direction in the sensor area, and a plurality of sensing electrodes electrically connected in a second direction crossing the first direction in the sensor area. The display driver may supply the touch driving signals to the plurality of driving electrodes and may receive touch sensing signals from the plurality of sensing electrodes during a mutual capacitance period.

The display driver may supply the touch driving signals to the plurality of driving electrodes and may receive the touch sensing signals from the plurality of driving electrodes during a first self-capacitance period after the mutual capacitance period.

The display driver may supply the touch driving signals to the plurality of sensing electrodes and may receive the touch sensing signals from the plurality of sensing electrodes during a second self-capacitance period after the first self-capacitance period.

According to embodiments of the present disclosure, the driving electrodes disposed at edges of a sensor area receive different touch driving signals from those of the driving electrodes disposed at the center of the sensor area, so that sensing signals of unit sensing areas can be uniformly adjusted, thereby improving touch sensitivity.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Figure 1:
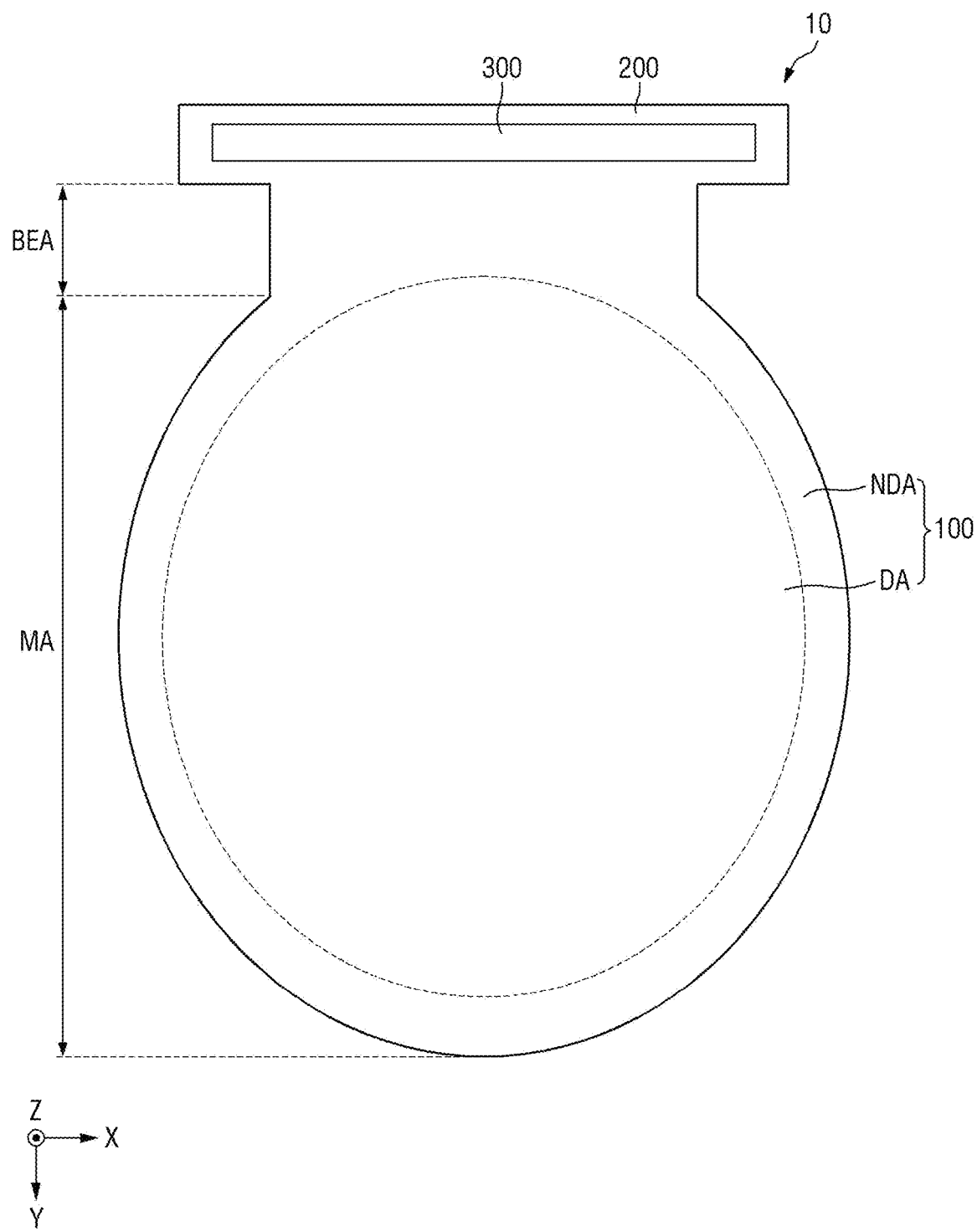
FIG. 1 is a plan view showing a display device according to an embodiment of the present disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, or aspects, etc. (hereinafter individually or collectively referred to as "elements"), of the various embodiments may be otherwise combined, separated, interchanged, or rearranged without departing from the disclosure.

The use of cross-hatching or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, or any other characteristic, attribute, property, etc., of the elements, unless specified.

Further, in the accompanying drawings, the size and relative sizes of elements may be exaggerated for clarity or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of A, B, and C" and "at least one selected from the group consisting of A, B, and C" may be construed as A only, B only, C only, or any combination of two or more of A, B, and C, such as, for instance, ABC, ABB, BC, CC, or the like. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and "including," when used in this specification, specify the presence of stated features, integers, steps, operations, elements, components, or groups thereof, but do not preclude the presence or addition of one or more other features, integers, steps, operations, elements, components, or groups thereof. It is also noted that, as used herein, the terms "substantially," "about," and other similar terms, are used as terms of approximation and not as terms of degree, and, as such, are utilized to account for inherent deviations in measured, calculated, or provided values that would be recognized by one of ordinary skill in the art.

Various embodiments are described herein with reference to sectional or exploded illustrations that are schematic illustrations of embodiments or intermediate structures. As such, variations from the shapes of the illustrations as a result, for example, of manufacturing techniques or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, or modules. Those skilled in the art will appreciate that these blocks, units, parts, or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, or modules being implemented by microprocessors or other similar hardware, they may be programmed and controlled using software (e.g., microcode) to perform various functions discussed herein and may optionally be driven by firmware or software. It is also contemplated that each block, unit, part, or module may be implemented by dedicated hardware, or as a combination of dedicated hardware to perform some functions and a processor (e.g., one or more programmed microprocessors and associated circuitry) to perform other functions. Also, each block, unit, part, or module of some embodiments may be physically separated into two or more interacting and discrete blocks, units, parts, or modules without departing from the scope of the disclosure. Further, the blocks, units, parts, or modules of some embodiments may be physically combined into more complex blocks, units, parts, or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the present disclosure will be described in detail with reference to the accompanying drawings.

FIG. 1 is a plan view showing a display device according to an embodiment of the present disclosure.

Referring to FIG. 1, a display device 10 may be employed by portable electronic devices such as a mobile phone, a smart phone, a tablet PC, a mobile communications terminal, an electronic notebook, an electronic book, a portable multimedia player (PMP), a navigation device and an ultra mobile PC (UMPC). For example, the display device 10 may be used as a display unit of a television, a laptop computer, a monitor, an electronic billboard, or the Internet of Things (IoT). For another example, the display device 10 may be applied to wearable devices such as a smart watch, a watch phone, a glasses-type display, and a head-mounted display (HMD) device. For another example, the display device 10 according to the embodiment may be used as a center information display (CID) disposed at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle.

At least a part of the display device 10 may have a circular shape in a plan view. For another example, the display device 10 may be formed in a polygonal shape or an oval shape in a plan view.

The display device 10 may include a display panel 100, a circuit board 200 and a display driver 300.

The display panel 100 may include a main area MA and a bending area BEA.

The main area MA may include a display area DA having pixels for displaying images, and a non-display area NDA located around the display area DA. The display area DA may have a circular shape in a plan view. For another example, the display area DA may have an oval shape, a partially-circular polygon shape, or a shape with rounded corners. The display area DA may output lights from a plurality of emission areas or a plurality of open areas. For example, the display panel 100 may include a pixel circuit including switching elements, a pixel-defining layer that defines the emission areas or the open areas, and self-light-emitting elements.

For example, the self-light-emitting element may include, but is not limited to, at least one of an organic light-emitting diode including an organic emissive layer, a quantum-dot light-emitting diode including a quantum-dot emissive layer, and an inorganic light-emitting diode including an inorganic semiconductor.

The non-display area NDA may be disposed on the outer side of the display area DA. The non-display area NDA may be defined as the edge of the main area MA of the display panel 100. The non-display area NDA may include a gate driver (not shown) that applies gate signals to gate lines, and fan-out lines (not shown) that connect the display driver 300 with the display area DA.

The bending area BEA may be disposed on one side of the main area MA. The bending area BEA may be located between the main area MA and the circuit board 200. The bending area BEA may include a flexible material that can be bent, folded, or rolled.

The circuit board 200 may be disposed on a side of the bending area BEA. For example, in case that the bending area BEA is bent, the circuit board 200 may overlap with the main area MA in the thickness direction (z-axis direction). The circuit board 200 may be formed integrally with the display panel 100. For another example, the circuit board 200 may be a flexible printed circuit board (FPCB), a printed circuit board (PCB), or a flexible film such as a chip-on-film (COF).

The display driver 300 may be mounted on the circuit board 200. The display driver 300 may output signals and voltages for driving the display panel 100. The display driver 300 may supply data voltages to data lines. The display driver 300 may apply a supply voltage to a voltage line and may supply gate control signals to the gate driver. The display driver 300 may be implemented as an integrated circuit (IC) and may be mounted on the circuit board 200 by a chip-on-glass (COG) technique, a chip-on-plastic (COP) technique, or ultrasonic bonding.

The display driver 300 may include a touch driver (not shown) and may be connected to a touch sensing unit of the display panel 100. The touch driver may provide touch driving signals to a plurality of touch electrodes of the touch sensing unit and may sense a change in the capacitance between the plurality of touch electrodes. For example, the touch driving signal may be a pulse signal having a predetermined frequency. The touch driver may determine whether a touch is input and may find the coordinates of the touch based on the amount of the change in the capacitance between the touch electrodes.

Figure 2:
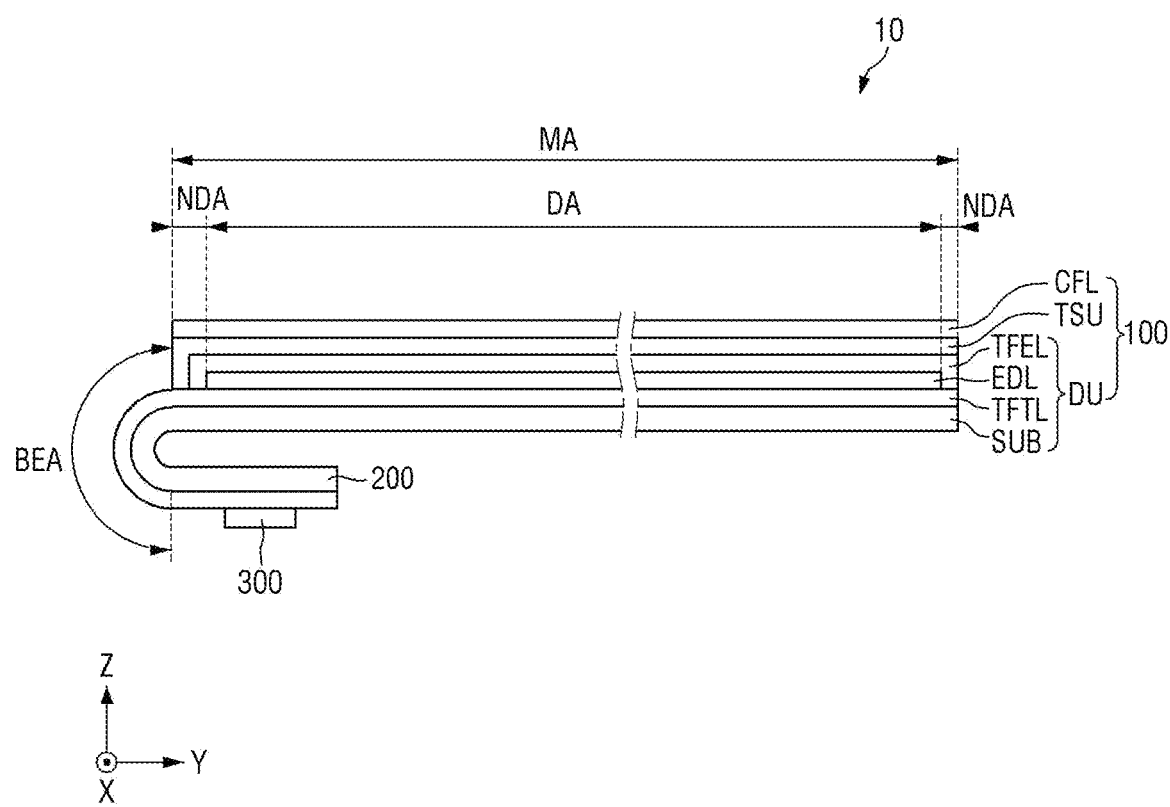
FIG. 2 is a cross-sectional view showing a display device according to an embodiment of the present disclosure.

FIG. 2 is a cross-sectional view showing a display device according to an embodiment of the present disclosure.

Referring to FIG. 2, the display panel 100 may include a display unit DU, a touch sensing unit TSU, and a color filter layer CFL. The display unit DU may include a substrate SUB, a thin-film transistor layer TFTL, an emission material layer EDL and an encapsulation layer TFEL.

The substrate SUB may be a base substrate or a base member and may be made of an insulating material such as a polymer resin. For example, the substrate SUB may be a flexible substrate that can be bent, folded, or rolled. In case that the substrate SUB is a flexible substrate, it may be formed of, but is not limited to, polyimide (PI).

The thin-film transistor layer TFTL may be disposed on the substrate SUB. The thin-film transistor layer TFTL may include a plurality of thin-film transistors forming pixel circuits of pixels. The thin-film transistor layer TFTL may further include gate lines, data lines, voltage lines, gate control lines, fan-out lines for connecting the display driver 300 with the data lines. Each of the thin-film transistors may include a semiconductor region, a source electrode, a drain electrode, and a gate electrode. For example, in case that the gate driver is formed on one side of the non-display area NDA of the display panel 100, the gate driver may include thin-film transistors.

The thin-film transistor layer TFTL may be disposed in the display area DA, the non-display area NDA, the bending area BEA and the circuit board 200. The thin-film transistors in each of the pixels, the gate lines, the data lines and the voltage lines in the thin-film transistor layer TFTL may be disposed in the display area DA. The gate control lines and the fan-out lines in the thin-film transistor layer TFTL may be disposed in the non-display area NDA, the bending area BEA and the circuit board 200.

The emission material layer EDL may be disposed on the thin-film transistor layer TFTL. The emission material layer EDL may include a plurality of light-emitting elements in each of which a first electrode, an emissive layer and a second electrode are stacked on one another sequentially to emit light, and a pixel-defining layer for defining the pixels. The plurality of light-emitting elements in the emission material layer EDL may be disposed in the display area DA.

For example, the emissive layer may be an organic light-emitting layer containing an organic material. The emissive layer may include a hole transporting layer, an organic light-emitting layer and an electron transporting layer. In case that a voltage is applied to the first electrode and a cathode voltage is applied to the second electrode through the thin-film transistors on the thin-film transistor layer TFTL, the holes and electrons may move to the organic light-emitting layer through the hole transporting layer and the electron transporting layer, respectively, such that they combine in the organic light-emitting layer to emit light. For example, the first electrode may be an anode electrode while the second electrode may be a cathode electrode. It is, however, to be understood that the present disclosure is not limited thereto.

For another example, the emission material layer EDL may include a quantum-dot light-emitting diode including a quantum-dot emissive layer or an inorganic light-emitting diode including an inorganic semiconductor.

The encapsulation layer TFEL may cover the upper and side surfaces of the emission material layer EDL, and can protect the emission material layer EDL. The encapsulation layer TFEL may include at least one inorganic layer and at least one organic layer for encapsulating the emission material layer EDL.

The touch sensing unit TSU may be disposed on the encapsulation layer TFEL. The touch sensing unit TSU may include a plurality of touch electrodes for sensing a user's touch by capacitive sensing, and touch lines connecting the plurality of touch electrodes with the display driver 300. The plurality of touch electrodes of the touch sensing unit TSU may be disposed in a sensor area overlapping the display area DA. The touch lines of the touch sensing unit TSU may be disposed in a peripheral area overlapping with the non-display area NDA. For example, the touch sensing unit TSU may sense a user's touch by mutual capacitance sensing or self-capacitance sensing.

For another example, the touch sensing unit TSU may be disposed on a separate substrate disposed on the display unit DU. In such case, the substrate supporting the touch sensing unit TSU may be a base member encapsulating the display unit DU.

The color filter layer CFL may be disposed on the touch sensing unit TSU. The color filter layer CFL may include a plurality of color filters associated with the plurality of emission areas, respectively. Each of the color filters may selectively transmit light of a particular wavelength and block or absorb lights of other wavelengths. The color filter layer CFL may absorb some of lights introduced from the outside of the display device 10 to reduce the reflection of external light. Accordingly, the color filter layer CFL can prevent distortion of colors due to the reflection of external light. Optionally, the color filter layer CFL may be eliminated.

Since the color filter layer CFL is disposed directly on the touch sensing unit TSU, the display device 10 may require no separate substrate for the color filter layer CFL. Therefore, the thickness of the display device 10 can be relatively reduced.

The bending area BEA of the display panel 100 and the circuit board 200 may be extended from one side of the main area MA. The bending area BEA may include a flexible material that can be bent, folded, or rolled. For example, in case that the bending area BEA is bent, the circuit board 200 may overlap with the main area MA in the thickness direction (z-axis direction). The display driver 300 may be mounted on the circuit board 200.

Figure 3:
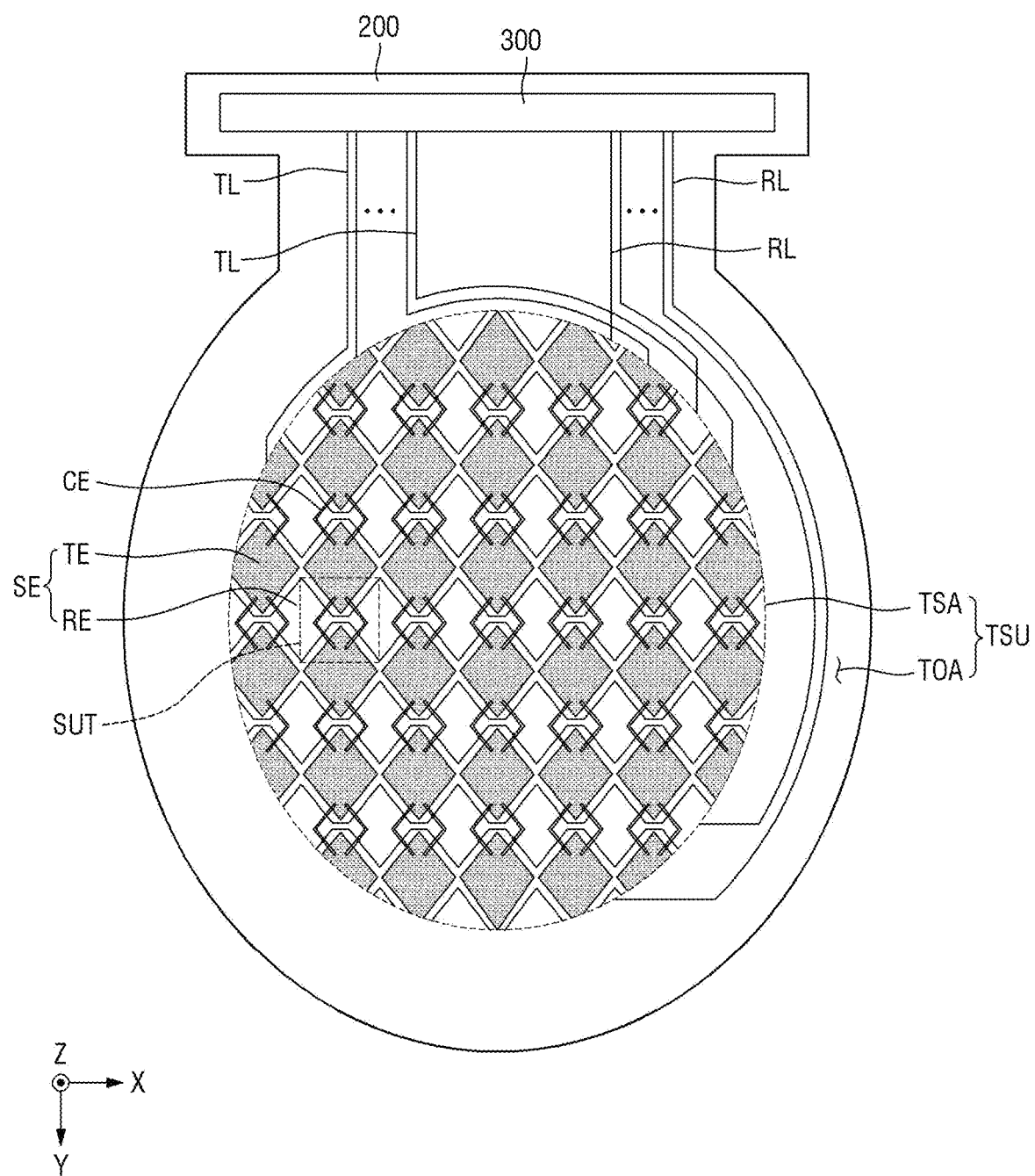
FIG. 3 is a plan view showing a touch sensing unit of a display device according to an embodiment of the present disclosure.

FIG. 3 is a plan view showing a touch sensing unit of a display device according to an embodiment of the present disclosure.

Referring to FIG. 3, the touch sensing unit TSU may include a sensor area TSA that senses a user's touch, and a peripheral area TOA around the sensor area TSA. The sensor area TSA may overlap with the display area DA of the display panel 100, and the peripheral area TOA may overlap with the non-display area NDA of the display panel 100.

The sensor area TSA may include a plurality of touch electrodes SE. The plurality of touch electrodes SE may form mutual capacitance or self capacitance to sense a touch of an object or person. The plurality of touch electrodes SE may include a plurality of driving electrodes TE and a plurality of sensing electrodes RE.

The plurality of driving electrodes TE may be arranged in the x-axis direction and the y-axis direction. The plurality of driving electrodes TE may be spaced apart from one another in the x-axis direction and the y-axis direction. The driving electrodes TE adjacent in the y-axis direction may be electrically connected through bridge electrodes CE. The driving electrodes TE may be electrically connected to the display driver 300 through driving lines TL. For example, the driving electrodes TE disposed on the upper side of the sensor area TSA may be electrically connected to the display driver 300 through the touch lines TL. The driving lines TL may be extended to the display driver 300 via the upper side of the peripheral area TOA, the bending area BEA and the circuit board 200.

The bridge electrodes CE may be bent at least once. Although the bridge electrodes CE may have the shape of angle brackets "<" or ">", the shape of the bridge electrodes CE in a plan view is not limited thereto. The driving electrodes TE adjacent to one another in the y-axis direction may be connected by the plurality of bridge electrodes CE. Even if one of the bridge electrodes CE is disconnected, the driving electrodes TE can be stably connected through the remaining bridge electrodes CE. The driving electrodes TE adjacent to each other may be connected by two bridge electrodes CE, but the number of bridge electrodes CE is not limited thereto.

The bridge electrodes CE may be disposed on a different layer from the plurality of driving electrodes TE and the plurality of sensing electrodes RE. The sensing electrodes RE adjacent to one another in the x-axis direction may be electrically connected through connectors disposed on the same layer as the plurality of driving electrodes TE or the plurality of sensing electrodes RE. The driving electrodes TE adjacent to one another in the y-axis direction may be electrically connected through the bridge electrodes disposed on a different layer from the plurality of driving electrodes TE or the plurality of sensing electrodes RE. Accordingly, even though the bridge electrodes CE overlap with the plurality of sensing electrodes RE in the thickness direction (z-axis direction), the plurality of driving electrodes TE and the plurality of sensing electrodes RE can be insulated from each other. Mutual capacitance may be formed between the driving electrodes TE and the sensing electrodes RE.

The plurality of sensing electrodes RE may be extended in the x-axis direction and may be spaced apart from one another in the y-axis direction. The plurality of sensing electrodes RE may be arranged in the x-axis direction and the y-axis direction, and the sensing electrodes RE adjacent to one another in the x-axis direction may be electrically connected through the connection portions.

The sensing electrodes RE may be electrically connected to the display driver 300 through sensing lines RL. For example, the sensing electrodes RE disposed on the right side of the sensor area TSA may be electrically connected to the display driver 300 through the sensing lines RL. The sensing lines RL may be extended to the display driver 300 via the right side of the peripheral area TOA, the bending area BEA and the circuit board 200.

Unit sensing areas SUT may be formed at the intersections of the driving electrodes TE and the sensing electrodes RE. Mutual capacitance between the driving electrodes TE and the sensing electrodes RE may be formed at each of the plurality of unit sensing areas SUT. The display driver 300 may supply touch driving signals to the driving electrodes TE, and the unit sensing areas SUT may charge the mutual capacitance. The display driver 300 may receive touch sensing signals from the sensing electrodes RE and may sense a change in the mutual capacitance of the unit sensing areas SUT.

The driving electrodes TE may have different areas. For example, the driving electrodes TE disposed at the center of the sensor area TSA may have a relatively large area as they keep their shape intact, whereas the driving electrodes TE disposed at the edges of the sensor area TSA may have a relatively small area as they cannot keep their shape intact.

The sensing electrodes RE may have different areas. For example, the sensing electrodes RE disposed at the center of the sensor area TSA may have a relatively large area as they keep their shape intact, whereas the sensing electrodes RE disposed at the edges of the sensor area TSA may have a relatively small area as they cannot keep their shape intact.

Accordingly, the size of the unit sensing areas SUT located at the center of the sensor area TSA may be larger than the size of the unit sensing areas SUT located at the edges of the sensor area TSA. The driving electrodes TE disposed at the edges of the sensor area TSA receive different touch driving signals from the driving electrodes TE disposed at the center of the sensor area TSA, so that the sensing signals of the unit sensing areas SUT can be uniformly adjusted to improve touch sensitivity.

Figure 4:
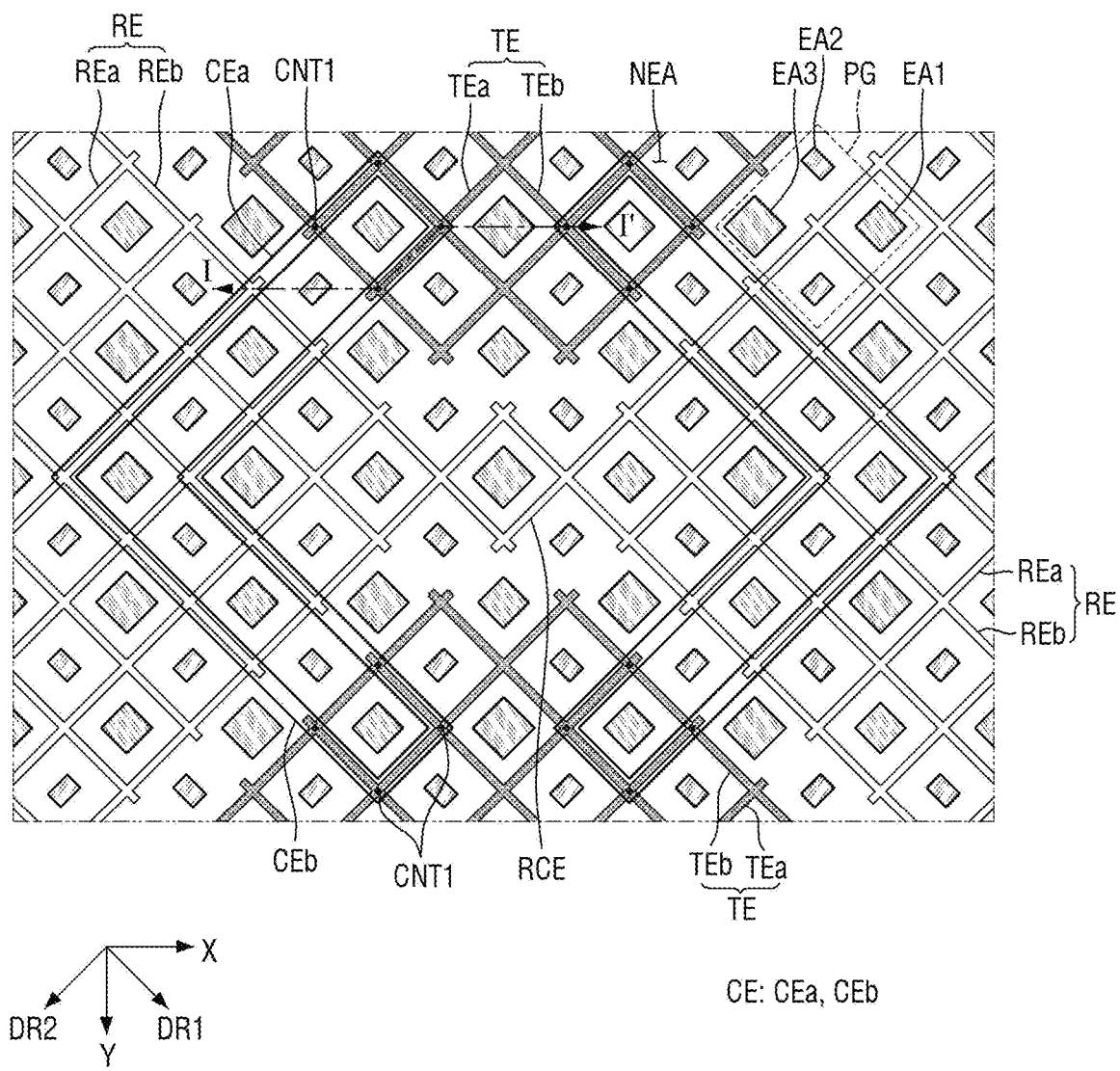
FIG. 4 is an enlarged view showing a part of a display device according to an embodiment of the present disclosure.

FIG. 4 is an enlarged view showing a part of a display device according to an embodiment of the present disclosure.

Referring to FIG. 4, a plurality of driving electrodes TE and a plurality of sensing electrodes RE may be disposed in the same layer and may be spaced apart from one another.

The plurality of driving electrodes TE may be arranged in the x-axis direction and the y-axis direction. The plurality of driving electrodes TE may be spaced apart from one another in the x-axis direction and the y-axis direction. The driving electrodes TE adjacent in the y-axis direction may be electrically connected through bridge electrodes CE.

The plurality of sensing electrodes RE may be extended in the x-axis direction and may be spaced apart from one another in the y-axis direction. The plurality of sensing electrodes RE may be arranged in the x-axis direction and the y-axis direction, and the sensing electrodes RE adjacent to one another in the x-axis direction may be electrically connected through connectors RCE. For example, the connectors RCE of the sensing electrodes RE may be disposed in the shortest distance between the driving electrodes TE adjacent to each other.

The bridge electrodes CE may be disposed on a different layer from the plurality of driving electrodes TE and the plurality of sensing electrodes RE. Each of the bridge electrodes CE may include a first portion CEa and a second portion CEb. For example, the first portion CEa of the bridge electrode CE may be connected to the driving electrode TE disposed on one side through a first contact hole CNT1 and may be extended in the second direction DR2. The second portion CEb of the bridge electrode CE may be bent from the first portion CEa where it overlaps the sensing electrode RE to be extended in the first direction DR1, and may be connected to the driving electrode TE disposed on the opposite side through the first contact hole CNT1. In the following description, the first direction DR1 may be a direction between the x-axis and the y-axis, and the second direction DR2 may be a direction between the opposite direction of the x-axis and the y-axis. Accordingly, each of the plurality of bridge electrodes CE may electrically connect adjacent driving electrodes TE in the y-axis direction.

For example, the plurality of driving electrodes TE and the plurality of sensing electrodes RE may be formed in a mesh or net pattern in a plan view. The driving electrodes TE and the sensing electrodes RE may surround the first to third emission areas EA1, EA2 and EA3 of a pixel group PG in a plan view. Accordingly, the driving electrodes TE and the sensing electrodes RE may overlap with none of the first to third emission areas EA1, EA2 and EA3. The plurality of bridge electrodes CE may not overlap with the first to third emission areas EA1, EA2 and EA3. Accordingly, the display device 10 can prevent the brightness of the lights exiting from the emission areas EA1, EA2 and EA3 from being lowered by the touch sensing unit TSU.

Each of the driving electrodes TE may include a first portion TEa extended in the second direction DR2 and a second portion TEb extended in the first direction DR1. Each of the sensing electrodes RE may include a first portion REa extended in the second direction DR2 and a second portion REb extended in the first direction DR1.

The plurality of pixels may include first to third sub-pixels. The first to third sub-pixels may include first to third emission areas EA1, EA2 and EA3, respectively. For example, the first emission area EA1 may emit light of a first color or red light, the second emission area EA2 may emit light of a second color or green light, and the third emission area EA3 may emit light of a third color or blue light. It is, however, to be understood that the present disclosure is not limited thereto.

A single pixel group PG may include one first emission area EA1, two second emission areas EA2 and one third emission area EA3 to represent black-and-white/grayscale levels. It should be understood, however, that the configuration of the pixel group PG is not limited thereto. Black-and-white/grayscale levels may be represented by a combination of light emitted from one first emission area EA1, lights emitted from two second emission areas EA2, and light emitted from one third emission areas EA3.

The first to third emission areas EA1, EA2 and EA3 may have different areas. For example, the size of the third emission area EA3 may be greater than the size of the first emission area EA1, and the size of the first emission area EA1 may be greater than the size of the second emission area EA2. It should be understood, however, that the present disclosure is not limited thereto. For another example, the first to third emission areas EA1, EA2 and EA3 may have the same area.

Figure 5:
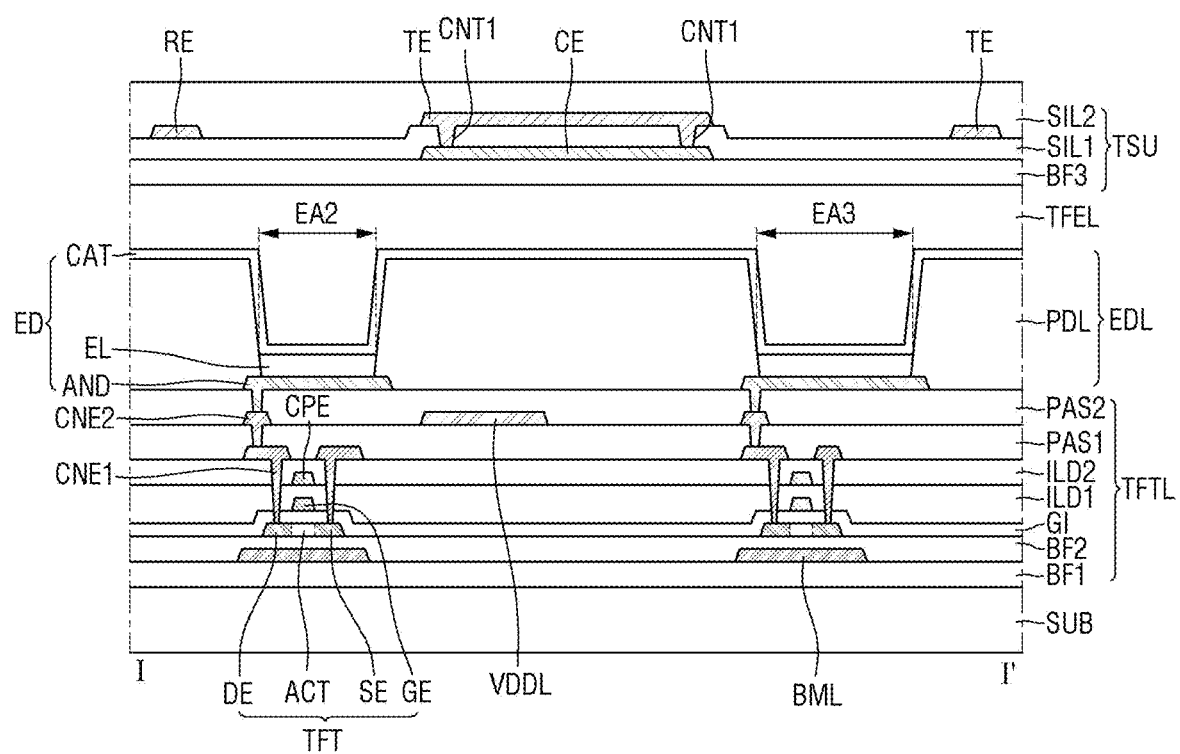
FIG. 5 is a cross-sectional view, taken along line I-I' of FIG. 4.

FIG. 5 is a cross-sectional view, taken along line I-I' of FIG. 4.

Referring to FIG. 5, the display panel 100 may include a display unit DU and a touch sensing unit TSU. The display unit DU may include a substrate SUB, a thin-film transistor layer TFTL, an emission material layer EDL and an encapsulation layer TFEL.

The substrate SUB may be a base substrate or a base member. The substrate SUB may be a flexible substrate that can be bent, folded, or rolled. For example, the substrate SUB may include, but is not limited to, a polymer resin such as polyimide PI. For another example, the substrate SUB may include a glass material or a metal material.

The thin-film transistor layer TFTL may include a first buffer layer BF1, a light-blocking layer BML, a second buffer layer BF2, a thin-film transistor TFT, a gate insulator GI, a first interlayer dielectric layer ILD1, a capacitor electrode CPE, a power line VDDL, a second interlayer dielectric layer ILD2, a first connection electrode CNE1, a first passivation layer PAS1, a second connection electrode CNE2 and a second passivation layer PAS2.

The first buffer layer BF1 may be disposed on the substrate SUB. The first buffer layer BF1 may include an inorganic film capable of preventing permeation of air or moisture. For example, the first buffer layer BF1 may include a plurality of inorganic films stacked on one another alternately.

The light-blocking layer BML may be disposed on the first buffer layer BF1. For example, the light-blocking layer BML may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof. For another example, the light-blocking layer BML may be an organic layer including a black pigment.

The second buffer layer BF2 may be disposed on the first buffer layer BF1 and the light-blocking layer BML. The second buffer layer BF2 may include an inorganic film capable of preventing permeation of air or moisture. For example, the second buffer layer BF2 may include a plurality of inorganic films stacked on one another alternately.

The thin-film transistor TFT may be disposed on the second buffer layer BF2 and may form a pixel circuit of each of a plurality of pixels. The thin-film transistor TFT may include a semiconductor region ACT, a source electrode SE, a drain electrode DE and a gate electrode GE.

The semiconductor region ACT, the source electrode SE and the drain electrode DE may be disposed on the second buffer layer BF2. The semiconductor region ACT, the source electrode SE and the drain electrode DE may overlap with the light-blocking layer BML in the thickness direction. The semiconductor region ACT may overlap with the gate electrode GE in the thickness direction and may be insulated from the gate electrode GE by the gate insulator GI. The source electrode SE and the drain electrode DE may be formed by converting the material of the semiconductor region ACT into a conductor.

The gate electrode GE may be disposed on the gate insulator GI. The gate electrode GE may overlap with the semiconductor region ACT with the gate insulator GI interposed therebetween.

The gate insulator GI may be disposed on the semiconductor region ACT, the source electrode SE, the drain electrode DE and the second buffer layer BF2. The gate insulator GI may insulate between the semiconductor region ACT and the gate electrode GE. The gate insulator GI may include a contact hole through which the first connection electrode CNE1 passes.

The first interlayer dielectric layer ILD1 may be disposed on the gate electrode GE and the gate insulator GI. The first interlayer dielectric layer ILD1 may insulate the gate electrode GE from the capacitor electrode CPE. The first interlayer dielectric layer ILD1 may include a contact hole through which the first connection electrode CNE1 passes.

The capacitor electrode CPE may be disposed on the first interlayer dielectric layer ILD1. The capacitor electrode CPE may overlap with the gate electrode GE in the thickness direction. The capacitor electrode CPE and the gate electrode GE may form a capacitor.

The second interlayer dielectric layer ILD2 may be disposed on the capacitor electrode CPE and the first interlayer dielectric layer ILD1. The second interlayer dielectric layer ILD2 may insulate the capacitor electrode CPE from the first connection electrode CNE1. The second interlayer dielectric layer ILD2 may include a contact hole through which the first connection electrode CNE1 passes.

The first connection electrode CNE1 may be disposed on the second interlayer dielectric layer ILD2. The first connection electrode CNE1 may electrically connect the drain electrode DE of the thin-film transistor TFT with the second connection electrode CNE2. The first connection electrode CNE1 may be inserted into a contact hole formed in the second interlayer dielectric layer ILD2, the first interlayer dielectric layer ILD1, and the gate insulator GI to be in contact with the drain electrode DE of the thin-film transistor TFT.

The first passivation layer PAS1 may be disposed on the first connection electrode CNE1 and the second interlayer dielectric layer ILD2. The first passivation layer PAS1 may insulate the first connection electrode CNE1 from the second connection electrode CNE2. The first passivation layer PAS1 can protect the thin-film transistor TFT. The first passivation layer PAS1 may include a contact hole through which the second connection electrode CNE2 passes.

The second connection electrode CNE2 may be disposed on the first passivation layer PAS1. The second connection electrode CNE2 may electrically connect the first connection electrode CNE1 with a pixel electrode AND of a light-emitting element ED. The second connection electrode CNE2 may be inserted into a contact hole formed in the first passivation layer PAS1 to be in contact with the first connection electrode CNE1.

The second passivation layer PAS2 may be disposed on the second connection electrode CNE2 and the first passivation layer PAS1. The second passivation layer PAS2 may insulate the second connection electrode CNE2 from the pixel electrode AND. The second passivation PAS2 may include a contact hole through which the pixel electrode AND of the light-emitting element ED passes.

The emission material layer EDL may be disposed on the thin-film transistor layer TFTL. The emission material layer EDL may include a light-emitting element ED and a pixel-defining layer PDL. The light-emitting diode ED may include the anode electrode AND, the emissive layer EL, and a cathode electrode CAT.

The pixel electrode AND may be disposed on the second passivation layer PAS2. The pixel electrode AND may overlap with one of the first to third emission areas EA1, EA2 and EA3 defined by the pixel-defining layer PDL. The pixel electrode AND may be electrically connected to the drain electrode DE of the thin-film transistor TFT through the first and second connection electrodes CNE1 and CNE2.

The emissive layer EL may be disposed on the pixel electrode AND. For example, the emissive layer EL may be, but is not limited to, an organic emissive layer made of an organic material. If the emissive layer EL is an organic emissive layer, in case that the thin-film transistor TFT applies a predetermined voltage to the pixel electrode AE of the light-emitting element ED and the common electrode CE of the light-emitting element ED receives a common voltage or cathode voltage, holes move to the emissive layer EL through the hole transporting layer and electrons move to the emissive layer EL through the electron transporting layer, and they combine in the emissive layer EL to emit light.

The common electrode CAT may be disposed on the emissive layer EL. For example, the common electrode CAT may be implemented as an electrode common to all pixels, instead of being disposed as a separated electrode for each of the pixels. The common electrode CAT may be disposed on the emissive layer EL in the first to third emission areas EA1, EA2 and EA3, and may be disposed on the pixel-defining layer PDL in the other areas than the first to third emission areas EA1, EA2 and EA3.

The common electrode CAT may receive a common voltage or a low-level voltage. In case that the pixel electrode AND receives the voltage equal to the data voltage and the common electrode CAT receives the low-level voltage, a potential difference is formed between the pixel electrode AND and the common electrode CAT, so that the emissive layer EL can emit light.

The pixel-defining film PDL may define first to third emission areas EA1, EA2 and EA3. The pixel-defining layer PDL may separate and insulate the pixel electrode AND of one of the plurality of light-emitting diodes ED from the pixel electrode of another one of the light-emitting diodes ED. The pixel-defining layer PDL may include a light-absorbing material. The pixel-defining layer PDL can prevent light reflection.

The encapsulation layer TFEL may be disposed on the common electrode CAT to cover the light-emitting diodes ED. The encapsulation layer TFEL may include at least one inorganic layer to prevent permeation of oxygen or moisture into the emission material layer EDL. The encapsulation layer TFEL may include at least one organic layer to protect the emission material layer EDL from foreign substances such as dust.

The touch sensing unit TSU may be disposed on the encapsulation layer TFEL. The touch sensing unit TSU may include a third buffer layer BF3, a bridge electrode CE, a first insulating layer SIL1, a driving electrode TE, a sensing electrode RE, and a second insulating layer SIL2.

The third buffer layer BF3 may be disposed on the encapsulation layer TFEL. The third buffer layer BF3 may be insulating and may have optical functions. The third buffer layer BF3 may include at least one inorganic layer. Optionally, the third buffer layer BF3 may be eliminated.

The bridge electrode CE may be disposed on the third buffer layer BF3. The bridge electrode CE may be disposed on a different layer from the driving electrode TE and the sensing electrode RE, and may electrically connect between the driving electrodes TE adjacent to one another in the y-axis direction.

The first insulating layer SIL1 may be disposed on the bridge electrode CE and the third buffer layer BF3. The first insulating layer SIL1 may have insulating and optical functionalities. For example, the first insulating layer SIL1 may be an inorganic layer including at least one selected from the group consisting of: a silicon nitride layer, a silicon oxynitride layer, a silicon oxide layer, a titanium oxide layer and an aluminum oxide layer. For another example, the first insulating layer SIL1 may include an organic film.

The driving electrodes TE and the sensing electrodes RE may be disposed on the first insulating layer SIL1. Each of the driving electrodes TE and the sensing electrodes RE may overlap with none of the first to third emission areas EA1, EA2 and EA3. Each of the driving electrodes TE and the sensing electrodes RE may be made up of a single layer of molybdenum (Mo), titanium (Ti), copper (Cu), aluminum (Al) or ITO (Indium Tin Oxide), or may be made up of a stack structure of aluminum and titanium (Ti/Al/Ti), a stack structure of aluminum and ITO (ITO/Al/ITO), an APC alloy, or a stack structure of an APC alloy and ITO (ITO/APC/ITO).

The second insulating layer SIL2 may be disposed on the driving electrodes TE, the sensing electrodes RE and the first insulating layer SIL1. The second insulating layer SIL2 may have insulating and optical features. The second insulating layer SIL2 may be made of one of the above-listed materials as the material of the first insulating layer SIL1.

Figure 6:
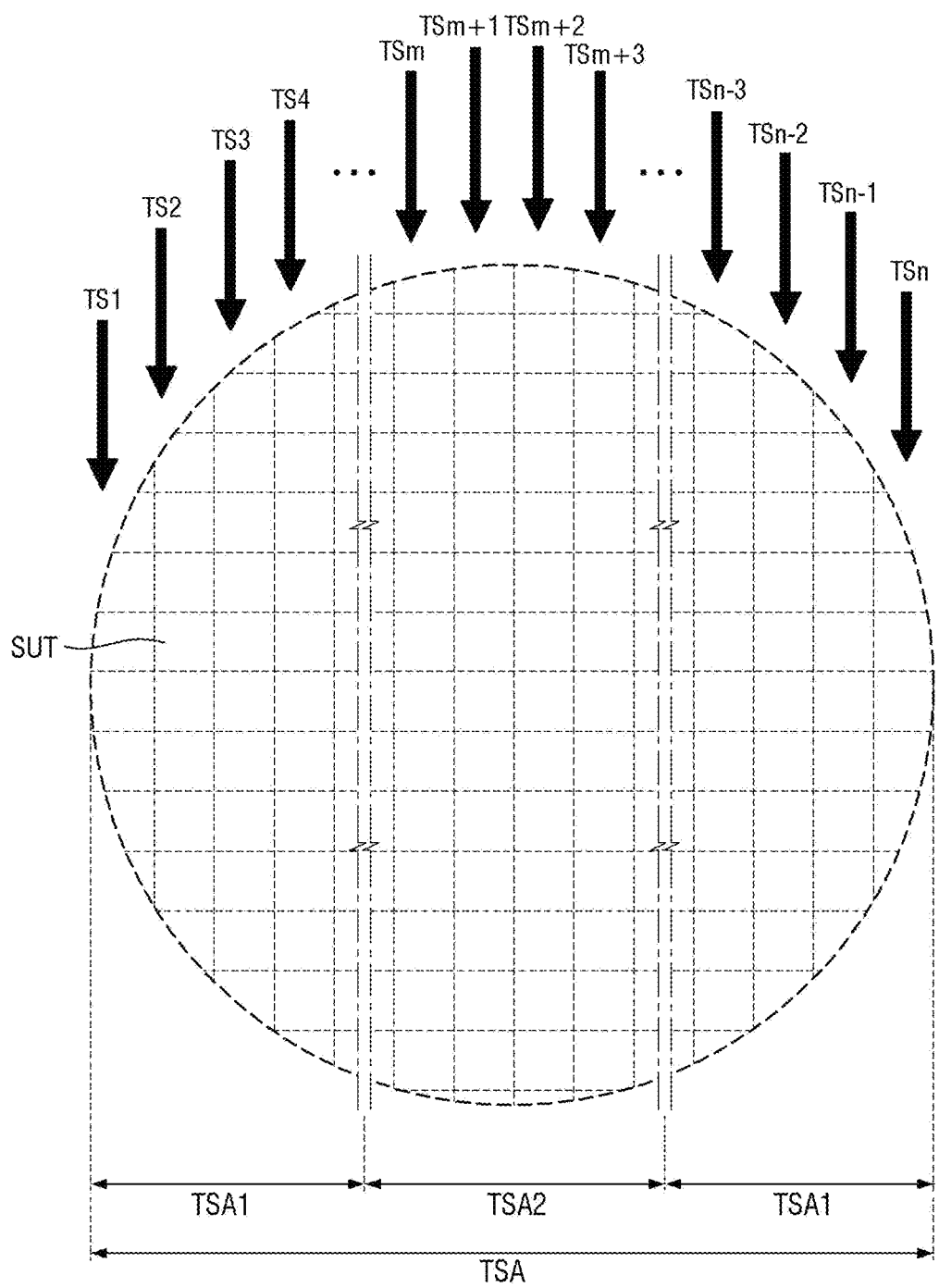
FIG. 6 is a view showing touch driving signals supplied to a sensor area in a display device according to an embodiment.

FIG. 6 is a view showing touch driving signals supplied to a sensor area in a display device according to an embodiment.

Referring to FIG. 6, the sensor area TSA may include first sensor areas TSA1 and a second sensor area TSA2. Each of the plurality of first sensor areas TSA1 may be located at the left edge or right edge of the sensor area TSA, and the second sensor area TSA2 may be located between the first sensor areas TSA1. The size of at least some of the driving electrodes TE in the first sensor area TSA1 may be smaller than the size of the driving electrodes TE in the second sensor area TSA2. The size of at least some of the unit sensing areas SUT in the first sensor area TSA1 may be smaller than the size of the unit sensing areas SUT in the second sensor area TSA2. One of the first sensor areas TSA1 may be referred to as a first sensor area (e.g. the first sensor area located at the left edge) and the other of the first sensor areas TSA1 may be referred to as a third sensor area (e.g. the first sensor area located at the right edge).

The display driver 300 may supply the first to fourth touch driving signals TS1, TS2, TS3 and TS4 to the driving electrodes TE arranged in the first to fourth columns, respectively. The driving electrodes TE arranged in the first to fourth columns may be disposed in the first sensor area TSA1. The display driver 300 may supply the $m^{th}$ to the $(m+3)^{th}$ touch driving signals TSm, TS(m+1), TS(m+2) and TS(m+3) to the driving electrodes TE arranged in the $m^{th}$ to the $(m+3)^{th}$ columns, respectively, where m is an integer greater than four. The driving electrodes TE arranged in the $m^{th}$ to the $(m+3)^{th}$ columns may be disposed in the second sensor area TSA2. The display driver 300 may supply the $(n-3)^{th}$ to $n^{th}$ column touch driving signals TS(n-3), TS(n-2), TS(n-1) and TSn to the driving electrodes TE arranged in the $(n-3)^{th}$ to $n^{th}$ columns, respectively, where n is an integer greater than m+6. The driving electrodes TE arranged in the $(n-3)^{th}$ to $n^{th}$ columns may be disposed in the first sensor area TSA1.

The driving electrodes TE arranged in a column may correspond to a channel, and the number of channels in each of the first and second sensor areas TSA1 and TSA2 is not limited to that shown in FIG. 6.

Figure 7:
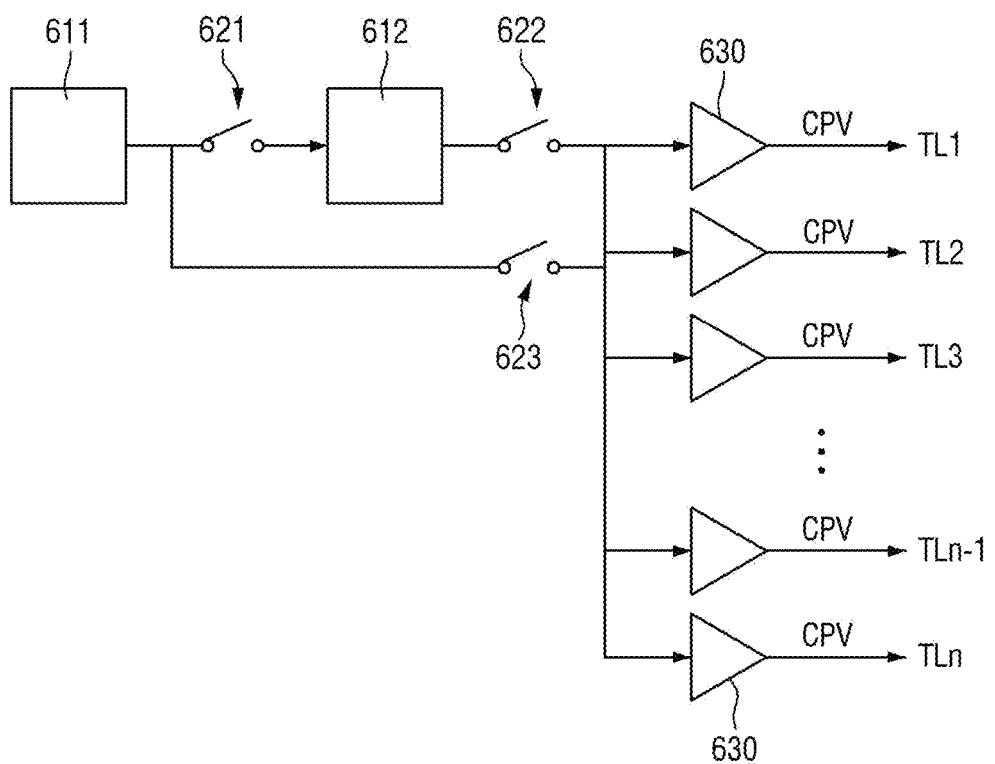
FIG. 7 is a diagram illustrating a voltage level output unit of a display driver in a display device according to an embodiment.

FIG. 7 is a diagram illustrating a voltage level output unit of a display driver in a display device according to an embodiment. Herein, the display driver 300 may include a touch driver (not shown), and the touch driver may include a voltage level output unit.

Referring to FIG. 7, the voltage level output unit 600 may include charge pumps 610, a switch unit 620, and amplifiers 630.

The charge pumps 610 may include first and second charge pumps 611 and 612. The number of charge pumps 610 is not limited by the example of FIG. 7. Each of the first and second charge pumps 611 and 612 may include at least one capacitor to store charges. The first and second charge pumps 611 and 612 may be connected in series or parallel to supply output voltages CPV of different levels to the touch lines TL.

For example, in case that the first and second switches 621 and 622 are turned on while the third switch 623 is turned off, the first and second charge pumps 611 and 612 may be connected in series, and the output voltage CPV of the first voltage level may be supplied to the touch lines TL through the amplifiers 630.

In case that the first switch 621 is turned off while the second and third switches 623 and 623 are turned on, the first and second charge pumps 611 and 612 may be connected in parallel, and the output voltage CPV of a second voltage level smaller than the first voltage level may be supplied to the touch lines TL through the amplifiers 630.

The voltage level output unit 600 may be synchronized with an oscillator (not shown) of the touch driver, and touch driving signals having an amplitude and a frequency may be output. The voltage level output unit 600 may determine the amplitude of the touch driving signals, and the oscillator may determine the frequency and waveform of the touch driving signals.

For example, some of the first to $n^{th}$ touch lines TL1, TL2, TL3, . . . , TL(n−1) and TLn may receive touch driving signals having the first voltage level during a first period, and some others of the first to $n^{th}$ touch lines TL1, TL2, TL3, . . . , TL(n−1) and TLn may receive touch driving signals having the second voltage level during a second period after the first period.

Figure 8:
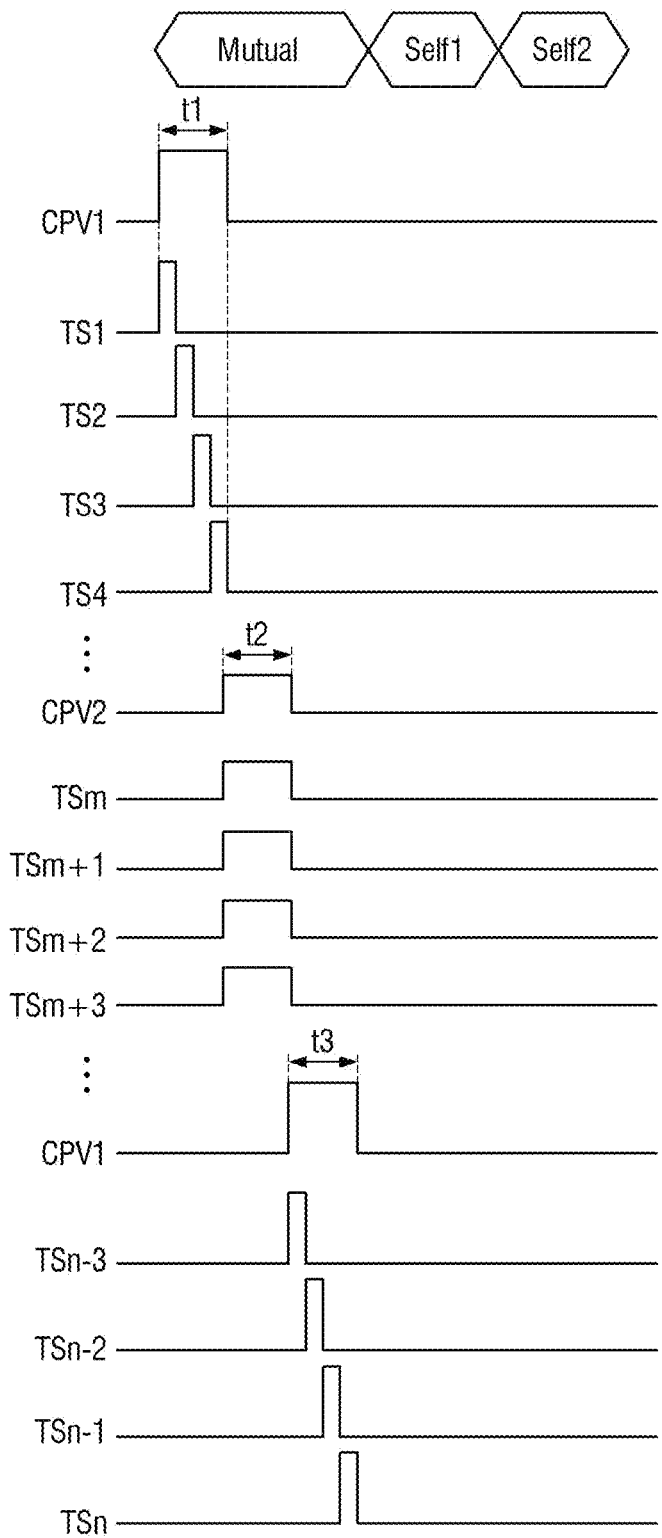
FIG. 8 is an example of a waveform diagram showing touch driving signals in a display device according to an embodiment.

FIG. 8 is an example of a waveform diagram showing touch driving signals in a display device according to an embodiment.

Referring to FIG. 8, the touch sensing unit TSU may sense a user's touch by mutual capacitance sensing during a mutual capacitance period Mutual, and may sense a user's touch by self-capacitance sensing during first and second self-capacitance periods Self1 and Self2. The touch sensing unit TSU may supply touch driving signals to the driving electrodes TE and receive touch sensing signals from the sensing electrodes RE during the mutual capacitance period Mutual. The touch sensing unit TSU may supply touch driving signals to the driving electrodes TE and receive touch sensing signals from the driving electrodes TE during a first self-capacitance period Self1. The touch sensing unit TSU may supply touch driving signals to the sensing electrodes RE and receive touch sensing signals from the sensing electrodes RE during a second self-capacitance period Self2.

Referring to FIG. 6, the touch driver 300 may supply touch driving signals to the driving electrodes TE arranged in first to fourth columns according to a single-channel driving scheme during a first period t1. Herein, the driving electrodes TE arranged in a column may correspond to one channel, and the single-channel driving scheme may sequentially supply touch driving signals to a plurality of channels. According to the single-channel driving scheme, the voltage level of the touch driving signals can be easily increased by sequentially supplying the touch driving signals to the different channels. The pulse width of each of the touch driving signals according to the single-channel driving scheme may be smaller than the pulse width of each of the touch driving signals according to the multi-channel driving scheme.

Referring to FIGS. 6 and 8, the touch driver 300 may supply first to fourth touch driving signals TS1, TS2, TS3 and TS4 to the driving electrodes TE arranged in the first to fourth columns during the first period t1, respectively. The first to fourth touch driving signals TS1, TS2, TS3 and TS4 may be synchronized with a first output voltage CPV1 having a first voltage level. The first to fourth touch driving signals TS1, TS2, TS3 and TS4 may be sequentially supplied to the driving electrodes TE arranged in the first to fourth columns during the first period t1.

The display driver 300 may supply touch driving signals to the driving electrodes TE arranged in the $m^{th}$ to the $(m+3)^{th}$ columns according to the multi-channel driving scheme during a second period t2. Herein, the multi-channel driving scheme may simultaneously supply touch driving signals to a plurality of channels. The display driver 300 may supply the $m^{th}$ to $(m+3)^{th}$ touch driving signals TSm, TS(m+1), TS(m+2) and TS(m+3) to the driving electrodes TE arranged in the $m^{th}$ to $(m+3)^{th}$ columns during the second period t2, respectively. The $m^{th}$ to $(m+3)^{th}$ touch driving signals TSm, TS(m+1), TS(m+2) and TS(m+3) may be synchronized with a second output voltage CPV2 having a second voltage level lower than the first voltage level. The $m^{th}$ to $(m+3)^{th}$ touch driving signals TSm, TS(m+1), TS(m+ 2) and TS(m+3) may be simultaneously supplied to the driving electrodes TE arranged in the $m^{th}$ to $(m+3)^{th}$ columns during the second period t2.

The touch driver 300 may supply touch driving signals to the driving electrodes TE arranged in the $(n−3)^{th}$ to the $n^{th}$ columns according to the single-channel driving scheme during a third period t3. The display driver 300 may supply the $(n−3)^{th}$ to $n^{th}$ column touch driving signals TS(n−3), TS(n−2), TS(n−1) and TSn to the driving electrodes TE arranged in the $(n−3)^{th}$ to $n^{th}$ columns, respectively, during the third period t3. The $(n−3)^{th}$ to $n^{th}$ column touch driving signals TS(n−3), TS(n−2), TS(n−1) and TSn may be synchronized with the first output voltage CPV1 having the first voltage level. The $(n−3)^{th}$ to $n^{th}$ column touch driving signals TS(n−3), TS(n−2), TS(n−1) and TSn may be sequentially supplied to the driving electrodes TE arranged in the $(n−3)^{th}$ to $n^{th}$ columns during the third period t3.

The size of at least some of the unit sensing areas SUT in the first sensor area TSA1 may be smaller than the size of the unit sensing areas SUT in the second sensor area TSA2. Accordingly, the display driver 300 may supply touch driving signals having the first voltage level to the driving electrodes TE disposed in the first sensor areas TSA1, and may supply touch driving signals having the second voltage level lower than the first voltage level to the driving electrodes TE disposed in the second sensor areas TSA2, so that touch sensitivity can be improved by uniformly adjusting the sensing signals of the unit sensing areas SUT. The display driver 300 may drive the driving electrodes TE disposed in the first sensor areas TSA1 according to the single-channel driving scheme, and may drive the driving electrodes TE disposed in the second sensor areas TSA2 according to the multi-channel driving scheme, so that the first voltage level of the first output voltage CPV1 can be easily increased.

Figure 9:
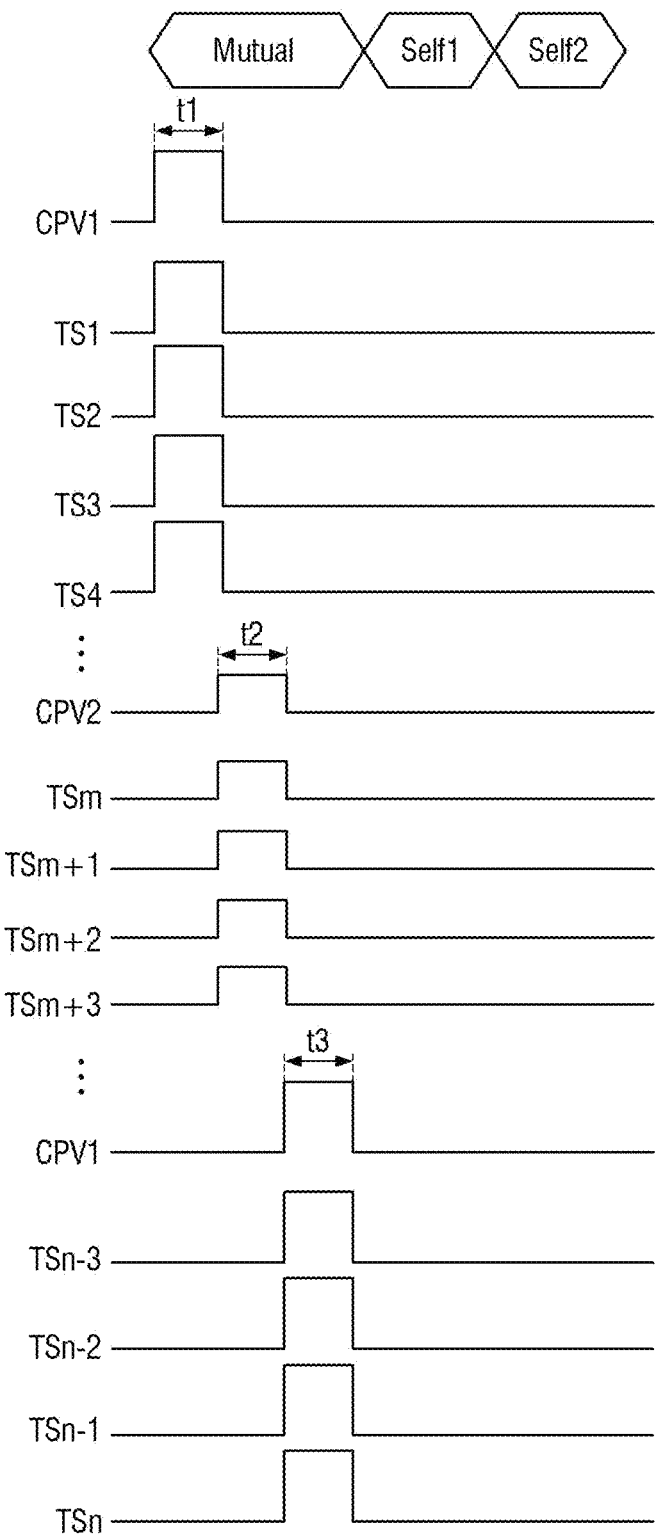
FIG. 9 is another example of a waveform diagram showing touch driving signals in a display device according to an embodiment.

FIG. 9 is another example of a waveform diagram showing touch driving signals in a display device according to an embodiment.

Referring to FIGS. 6 and 9, the display driver 300 may supply touch driving signals to the driving electrodes TE arranged in first to fourth columns according to the multi-channel driving scheme during a first period t1. The touch driver 300 may supply first to fourth touch driving signals TS1, TS2, TS3 and TS4 to the driving electrodes TE arranged in the first to fourth columns during the first period t1, respectively. The first to fourth touch driving signals TS1, TS2, TS3 and TS4 may be synchronized with a first output voltage CPV1 having a first voltage level. The first to fourth touch driving signals TS1, TS2, TS3 and TS4 may be simultaneously supplied to the driving electrodes TE arranged in the first to fourth columns during the first period t1.

The touch driver 300 may supply touch driving signals to the driving electrodes TE arranged in the $m^{th}$ to the $(m+3)^{th}$ columns according to the multi-channel driving scheme during a second period t2. The display driver 300 may supply the $m^{th}$ to $(m+3)^{th}$ touch driving signals TSm, TS(m+1), TS(m+2) and TS(m+3) to the driving electrodes TE arranged in the $m^{th}$ to $(m+3)^{th}$ columns during the second period t2, respectively. The $m^{th}$ to $(m+3)^{th}$ touch driving signals TSm, TS(m+1), TS(m+2) and TS(m+3) may be synchronized with a second output voltage CPV2 having a second voltage level lower than the first voltage level. The $m^{th}$ to $(m+3)^{th}$ touch driving signals TSm, TS(m+1), TS(m+2) and TS(m+3) may be simultaneously supplied to the driving electrodes TE arranged in the $m^{th}$ to $(m+3)^{th}$ columns during the second period t2.

The display driver 300 may supply touch driving signals to the driving electrodes TE arranged in the $(n-3)^{th}$ to the $n^{th}$ columns according to the multi-channel driving scheme during a third period t3. The display driver 300 may supply the $(n-3)^{th}$ to $n^{th}$ column touch driving signals TS(n-3), TS(n-2), TS(n-1) and TSn to the driving electrodes TE arranged in the $(n-3)^{th}$ to $n^{th}$ columns, respectively, during the third period t3. The $(n-3)^{th}$ to $n^{th}$ column touch driving signals TS(n-3), TS(n-2), TS(n-1) and TSn may be synchronized with the first output voltage CPV1 having the first voltage level. The $(n-3)^{th}$ to $n^{th}$ column touch driving signals TS(n-3), TS(n-2), TS(n-1) and TSn may be simultaneously supplied to the driving electrodes TE arranged in the $(n-3)^{th}$ to $n^{th}$ columns during the third period t3.

The size of at least some of the unit sensing areas SUT in the first sensor area TSA1 may be smaller than the size of the unit sensing areas SUT in the second sensor area TSA2. Accordingly, the display driver 300 may supply touch driving signals having the first voltage level to the driving electrodes TE disposed in the first sensor areas TSA1, and may supply touch driving signals having the second voltage level lower than the first voltage level to the driving electrodes TE disposed in the second sensor areas TSA2, so that touch sensitivity can be improved by uniformly adjusting the sensing signals of the unit sensing areas SUT.

Figure 10:
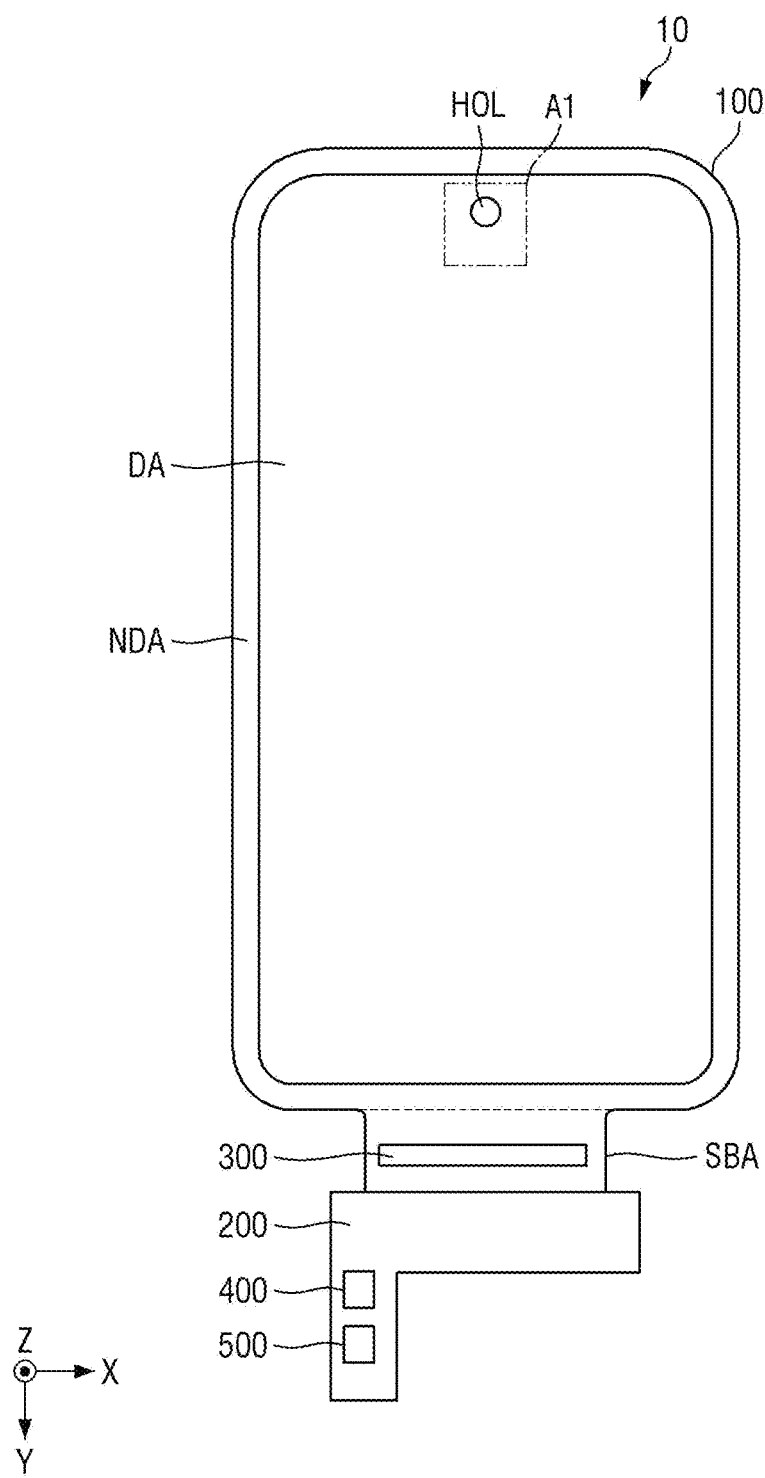
FIG. 10 is a plan view showing a display device according to another embodiment of the present disclosure.

FIG. 10 is a plan view showing a display device according to another embodiment of the present disclosure.

Referring to FIG. 10, the display device 10 may have a shape similar to a rectangle in a plan view. For example, the display device 10 may have a shape similar to a rectangle having shorter sides in the x-axis direction and longer sides in the y-axis direction in a plan view. The corners where the shorter sides in the x-axis direction and the longer sides in the y-axis direction meet may be rounded to have a predetermined curvature or may be formed at a right angle. The shape of the display device 10 in a plan view is not limited to a quadrangular shape, but may be formed in a shape similar to other polygonal shapes, a circular shape, or an elliptical shape.

The display device 10 may include a display panel 100, a circuit board 200, a display driver 300, a touch driver 400, and a power supply unit 500.

The display panel 100 may include a display area DA, a hole HOL and a non-display area NDA. The display area DA may include pixels for displaying images. The display area DA may output lights from a plurality of emission areas or a plurality of open areas. For example, the display area DA may include pixel circuits including switching elements, a pixel-defining layer that defines the emission areas or the open areas, and self-light-emitting elements.

The display area DA may occupy a substantial part of the display panel 100. The display area DA may include a plurality of pixels to display major parts of images and accordingly can achieve the main purpose of the display device 10.

The hole HOL may be located at one edge of the display area DA, but the present disclosure is not limited thereto. The hole HOL may be surrounded by the display area DA. The hole HOL may at least partially penetrate the display panel 100 to improve the efficiency of light transmission. The display device 10 may include at least one of: a front camera, a face recognition camera, an infrared camera, a proximity sensor, an illuminance sensor, an iris sensor, and a fingerprint recognition sensor in line with the HOL under the display panel 100.

The non-display area NDA may be disposed around the display area DA. The non-display area NDA may be defined as an edge of the display panel 100. The non-display area NDA may include a gate driver (not shown) that applies gate signals to gate lines, and fan-out lines (not shown) that connect the display driver 300 with the display area DA.

The subsidiary area SBA may be extended from one side of the non-display area NDA. The subsidiary area SUB may include a flexible material that can be bent, folded, or rolled. For example, in case that the subsidiary area SBA is bent, the subsidiary area SBA may overlap with the display area DA in the thickness direction (z-axis direction). The subsidiary area SBA may include pads connected to the display driver 200 and the circuit board 300. Optionally, the subsidiary area SBA may be eliminated, and the display driver 300 and the pads may be disposed in the non-display area NDA.

The circuit board 200 may be attached on the pads of the display panel 100 using an anisotropic conductive film (ACF). Lead lines of the circuit board 200 may be electrically connected to the pads of the display panel 300. The circuit board 200 may be a flexible printed circuit board (FPCB), a printed circuit board (PCB), or a flexible film such as a chip-on-film (COF).

The display driver 300 may output signals and voltages for driving the display panel 100. The display driver 300 may supply data voltages to data lines. The display driver 300 may apply a supply voltage to a voltage line and may supply gate control signals to the gate driver. The display driver 300 may be implemented as an integrated circuit (IC) and may be attached on the display panel 100 by a chip-on-glass (COG) technique, a chip-on-plastic (COP) technique, or ultrasonic bonding. For example, the display driver 300 may be disposed in the subsidiary area SBA, and may overlap with the display area DA in the thickness direction (z-axis direction) as the subsidiary area SBA is bent. For another example, the display driver 300 may be mounted on the circuit board 200.

The touch driver 400 may be mounted on the circuit board 200. The touch driver 400 may be electrically connected to a touch sensing unit of the display panel 100. The touch driver 400 may supply touch driving signals to a plurality of touch electrodes of the touch sensing unit and may sense a change in the capacitance between the plurality of touch electrodes. For example, the touch driving signal may be a pulse signal having a predetermined frequency. The touch driver 400 may determine whether there is an input and may find the coordinates of the input based on the amount of the change in the capacitance between the touch electrodes. The touch driver 400 may be implemented as an integrated circuit (IC).

The power supply unit 500 may be disposed on the circuit board 200 to apply a supply voltage to the display drivers 300 and the display panel 100. The power supply unit 500 may generate a driving voltage to supply it to a driving voltage line, and may generate a common voltage to supply it to a common electrode shared by the light-emitting elements of a plurality of pixels For example, the driving voltage may be a high-level voltage for driving the light-emitting element, and the common voltage may be a low-level voltage for driving the light-emitting element. The power supply unit 500 may generate an initialization voltage to supply it to the initialization voltage line, may generate a reference voltage to supply it to a reference voltage line, and may generate a bias voltage to supply it to a bias voltage line.

Figure 11:
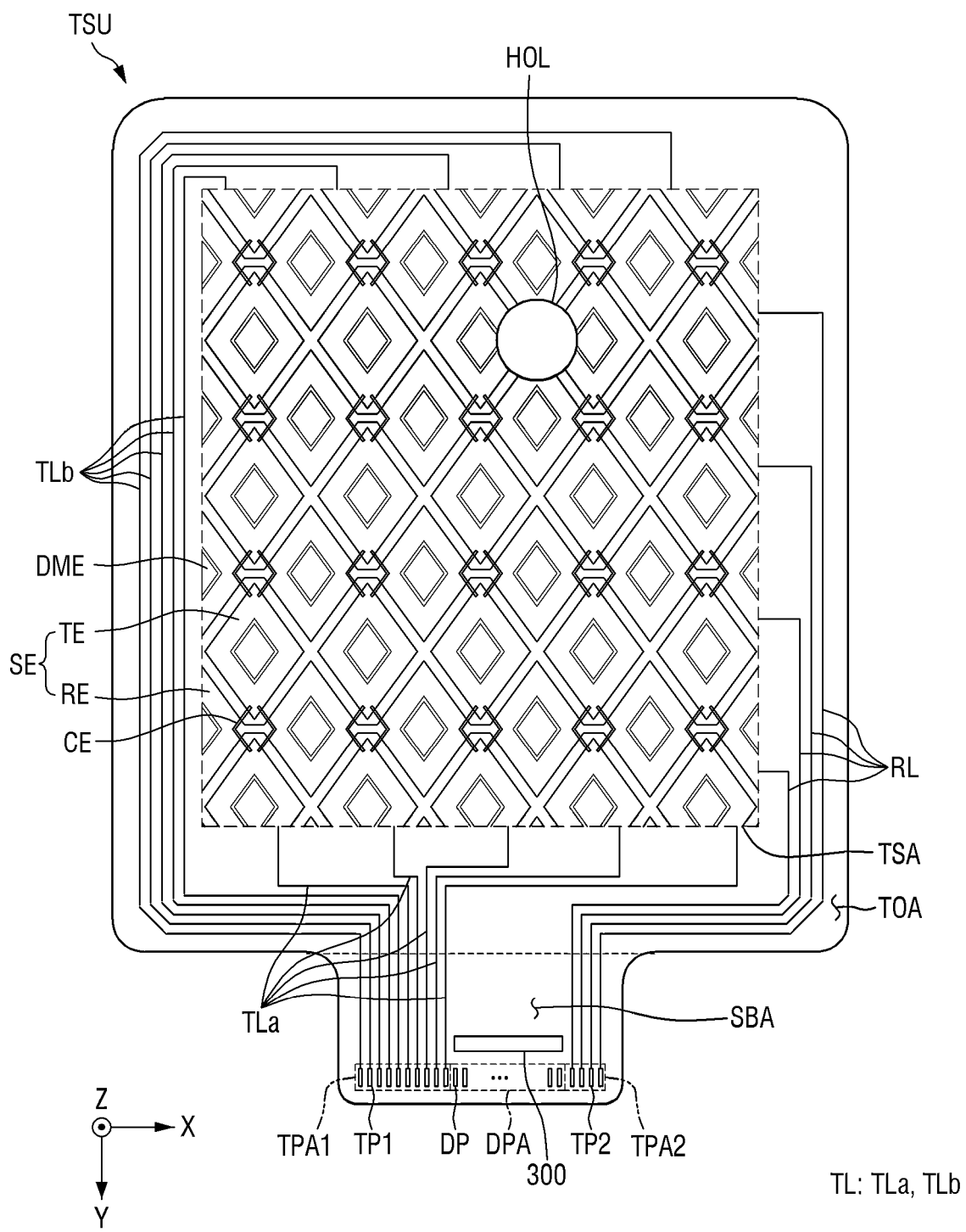
FIG. 11 is a plan view showing a touch sensing unit of a display device according to another embodiment of the present disclosure.

FIG. 11 is a plan view showing a touch sensing unit of a display device according to another embodiment of the present disclosure.

Referring to FIG. 11, the touch sensing unit TSU may include a sensor area TSA that senses a user's touch, and a peripheral area TOA around the sensor area TSA. The sensor area TSA may overlap with the display area DA, and the peripheral area TOA may overlap with the non-display area NDA.

The sensor area TSA may include a plurality of touch electrodes SE and a plurality of dummy electrodes DME. The plurality of touch electrodes SE may form mutual capacitance or self capacitance to sense a touch of an object or person. The plurality of touch electrodes SE may include a plurality of driving electrodes TE and a plurality of sensing electrodes RE.

The sensor area TSA may include a hole HOL. The driving electrodes TE and the sensing electrodes RE may not be disposed at the hole HOL. The hole HOL may be surrounded by the driving electrodes TE and the sensing electrodes RE. The hole HOL may at least partially penetrate the display panel 100 to improve the efficiency of light transmission.

The plurality of driving electrodes TE may be arranged in the x-axis direction and the y-axis direction. The plurality of driving electrodes TE may be spaced apart from one another in the x-axis direction and the y-axis direction. The driving electrodes TE adjacent in the y-axis direction may be electrically connected through bridge electrodes CE.

The driving electrodes TE may be electrically connected to first touch pads TP1 through driving lines TL. The driving lines TL may include lower driving lines TLa and upper driving lines TLb. For example, the driving electrodes TE disposed on the lower side of the sensor area TSA may be connected to the first touch pads TP1 through the lower driving lines TLa, and the driving electrodes TE disposed on the upper side of the touch sensor area TSA may be connected to the first touch pads TP1 through the upper driving lines TLb. The lower driving lines TLa may be extended to the first touch pads TP1 beyond the lower side of the peripheral area TOA. The upper driving lines TLb may be extended to the first touch pads TP1 via the upper side, the left side and the lower side of the peripheral area TOA. The first touch pads TP1 may be electrically connected to the touch driver 400 through the circuit board 200.

The bridge electrodes CE may be bent at least once. The driving electrodes TE adjacent to one another in the y-axis direction may be connected by the plurality of bridge electrodes CE. Even if one of the bridge electrodes CE is disconnected, the driving electrodes TE can be stably connected through the remaining bridge electrodes CE. The bridge electrodes CE may be disposed on a different layer from the plurality of driving electrodes TE and the plurality of sensing electrodes RE. The sensing electrodes RE adjacent to one another in the x-axis direction may be electrically connected through connectors disposed on the same layer as the plurality of driving electrodes TE or the plurality of sensing electrodes RE. The driving electrodes TE adjacent to one another in the y-axis direction may be electrically connected through the bridge electrodes disposed on a different layer from the plurality of driving electrodes TE or the plurality of sensing electrodes RE. Mutual capacitance may be formed between the driving electrodes TE and the sensing electrodes RE.

The plurality of sensing electrodes RE may be extended in the x-axis direction and may be spaced apart from one another in the y-axis direction. The plurality of sensing electrodes RE may be arranged in the x-axis direction and the y-axis direction, and the sensing electrodes RE adjacent to one another in the x-axis direction may be electrically connected through the connection portions.

The sensing electrodes RE may be electrically connected to the second touch pads TP2 through sensing lines RL. For example, the sensing electrodes RE disposed on the right side of the sensor area TSA may be connected to the second touch pads TP2 through the sensing lines RL. The sensing lines RL may be extended to the second touch pads TP2 through the right side and the lower side of the peripheral area TPA. The second touch pads TP2 may be electrically connected to the touch driver 400 through the circuit board 200.

Each of the plurality of dummy electrodes DME may be surrounded by the driving electrode TE or the sensing electrode RE. Each of the plurality of dummy electrodes DME may be spaced apart from and insulated from the driving electrode TE or the sensing electrode RE. Accordingly, the dummy electrodes DME may be electrically floating.

The display pad area DPA, the first touch pad area TPA1 and the second touch pad area TPA2 may be disposed on the edge of the subsidiary area SBA. The display pad area PA, the first touch pad area TPA1 and the second touch pad area TPA2 may be electrically connected to the circuit board 200 using a low-resistance, high-reliable material such as an anisotropic conductive film and a self assembly anisotropic conductive paste (SAP).

The first touch pad area TPA1 may be disposed on one side of the display pad area DPA and may include a plurality of first touch pads TP1. The plurality of first touch pads TP1 may be electrically connected to the touch driver 400 disposed on the circuit board 200. The plurality of first touch pads TP1 may supply touch driving signals to the plurality of driving electrodes TE through the plurality of driving lines TL.

The second touch pad area TPA2 may be disposed on the opposite side of the display pad area DPA and may include a plurality of second touch pads TP2. The plurality of second touch pads TP2 may be electrically connected to the touch driver 400 disposed on the circuit board 200. The touch driver 400 may receive a touch sensing signal through the plurality of sensing lines RL connected to the plurality of second touch pads TP2, and may sense a change in the capacitance between the driving electrodes TE and the sensing electrodes RE.

As another example, the touch driver 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driver 400 may sense a change in the amount of charges in each of the plurality of driving electrodes TE and the plurality of sensing electrodes RE based on the touch sensing signal.

Figure 12:
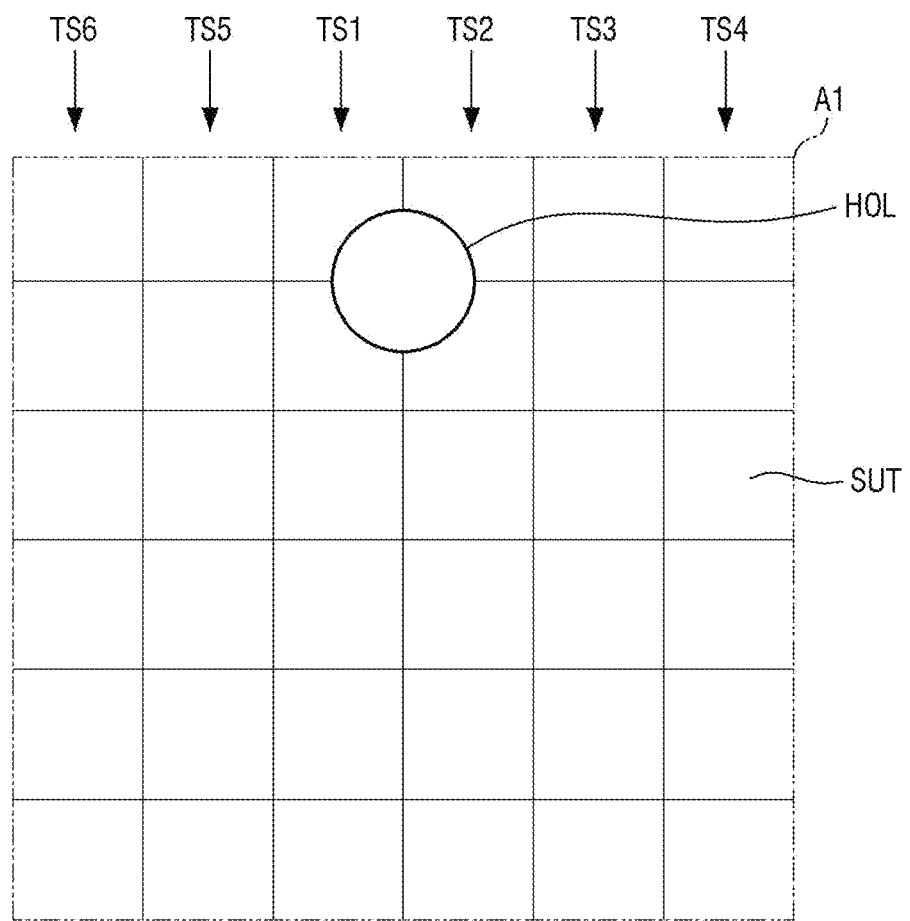
FIG. 12 is a diagram showing touch driving signals supplied to area A1 of FIG. 10.

FIG. 12 is a diagram showing touch driving signals supplied to area A1 of FIG. 10.

Referring to FIGS. 11 and 12, the sensor area TSA may include a hole HOL. The driving electrodes TE and the sensing electrodes RE may not be disposed at the hole HOL. The hole HOL may be surrounded by the driving electrodes TE and the sensing electrodes RE. The hole HOL may at least partially penetrate the display panel 100 to improve the efficiency of light transmission.

The size of the driving electrodes TE directly adjacent to the hole HOL may be smaller than the size of the driving electrodes TE not adjacent to the hole HOL. The size of the unit sensing areas SUT directly adjacent to the hole HOL may be smaller than the size of the unit sensing areas SUT not adjacent to the hole HOL. The driving electrodes TE arranged in a column may correspond to one channel. For example, some of the driving electrodes TE arranged in the first and second columns may directly surround the hole HOL, and the driving electrodes TE arranged in the third and fourth columns located on the right side of the second column and the driving electrodes TE arranged in the fifth and sixth columns located on the left side of the first column may not be adjacent to the hole HOL.

The touch driver 400 may supply first and second touch driving signals TS1 and TS2 to the driving electrodes TE arranged in the first and second columns, respectively. The display driver 400 may supply the third to sixth touch driving signals TS3, TS4, TS5 and TS6 to the driving electrodes TE arranged in the third to sixth columns.

Figure 13:
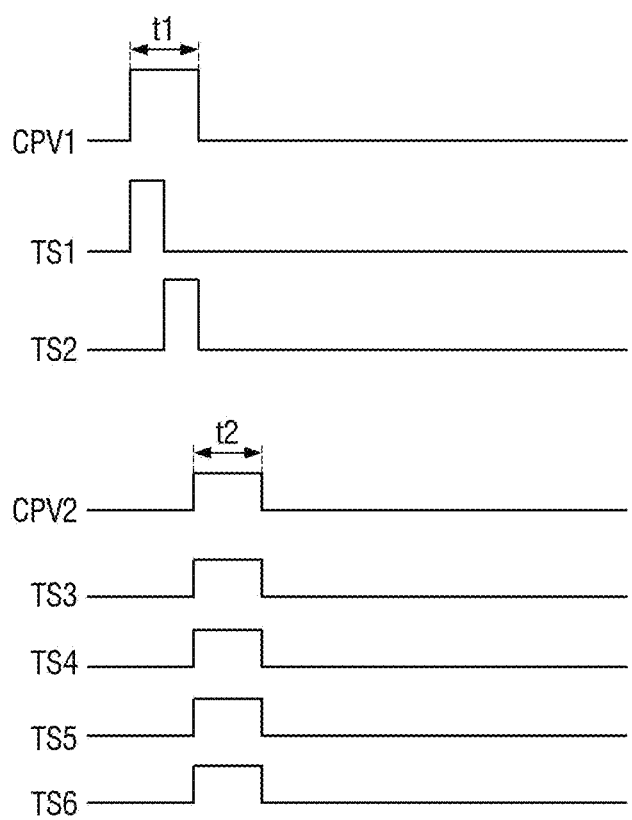
FIG. 13 is an example of a waveform diagram showing touch driving signals in a display device according to another embodiment.

FIG. 13 is an example of a waveform diagram showing touch driving signals in a display device according to another embodiment.

Referring to FIG. 13, the touch driver 400 may supply touch driving signals to the driving electrodes TE arranged in first and second columns in a single-channel driving scheme during a first period t1. Herein, the driving electrodes TE arranged in a column may correspond to one channel, and the single-channel driving scheme may sequentially supply touch driving signals to a plurality of channels. According to the single-channel driving scheme, the voltage level of the touch driving signals can be easily increased by supplying the touch driving signals to the different channels. The touch driver 400 may supply first and second touch driving signals TS1 and TS2 to the driving electrodes TE arranged in the first and second columns during the first period t1, respectively. The first and second touch driving signals TS1 and TS2 may be synchronized with a first output voltage CPV1 having a first voltage level. The first and second touch driving signals TS1 and TS2 may be sequentially supplied to the driving electrodes TE arranged in the first and second columns during the first period t1.

The touch driver 400 may supply touch driving signals to the driving electrodes TE arranged in the third to the sixth columns according to the multi-channel driving scheme during a second period t2. Herein, the multi-channel driving scheme may simultaneously supply touch driving signals to a plurality of channels. The display driver 400 may supply the third to sixth touch driving signals TS3, TS4, TS5 and TS6 to the driving electrodes TE arranged in the third to sixth columns during the second period t2. The third to the sixth touch driving signals TS3, TS4, TS5 and TS6 may be synchronized with a second output voltage CPV2 having a second voltage level lower than the first voltage level. The third to sixth touch driving signals TS3, TS4, TS5 and TS6 may be simultaneously supplied to the driving electrodes TE arranged in the third to sixth columns during the second period t2.

The size of the unit sensing areas SUT directly adjacent to the hole HOL may be smaller than the size of the unit sensing areas SUT not adjacent to the hole HOL. Accordingly, the touch driver 400 may supply touch driving signals having a first voltage level to the driving electrodes TE directly adjacent to the hole HOL, and supply touch driving signals having a second voltage level lower than the first voltage level to the driving electrodes TE not adjacent to the hole HOL, so that touch sensitivity can be improved by uniformly adjusting the sensing signals of the unit sensing areas SUT. The display driver 400 may drive the driving electrodes TE directly adjacent to the hole HOL according to the single-channel driving scheme, and may drive the driving electrodes TE not adjacent to the hole HOL according to the multi-channel driving scheme, so that the first voltage level of the first output voltage CPV1 can be easily increased.

Figure 14:
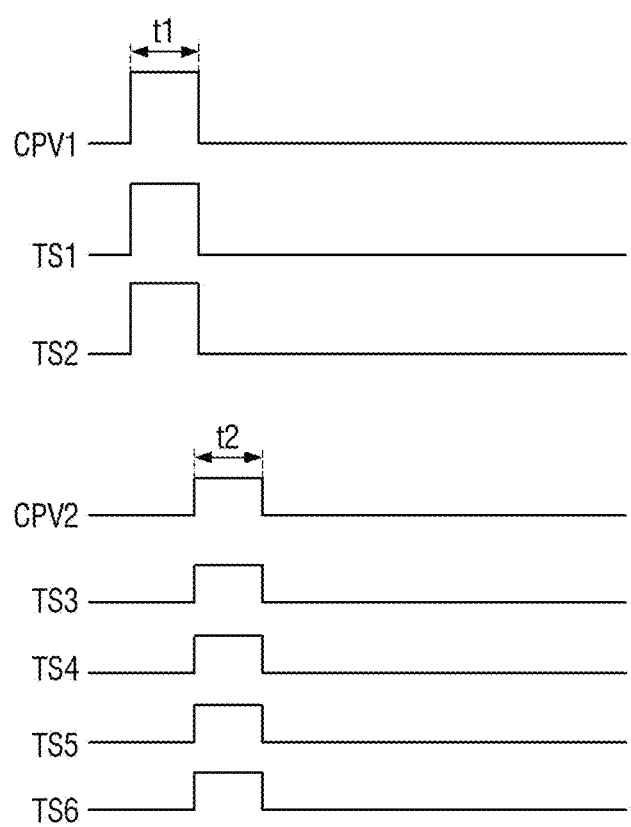
FIG. 14 is another example of a waveform diagram showing touch driving signals in a display device according to another embodiment.

FIG. 14 is another example of a waveform diagram showing touch driving signals in a display device according to another embodiment.

Referring to FIG. 14, the touch driver 400 may supply touch driving signals to the driving electrodes TE arranged in first and second columns according to a multi-channel driving scheme during a first period t1. Herein, the driving electrodes TE arranged in a column may correspond to one channel, and the multi-channel driving scheme may simultaneously supply touch driving signals to a plurality of channels. The touch driver 400 may supply first and second touch driving signals TS1 and TS2 to the driving electrodes TE arranged in the first and second columns during the first period t1, respectively. The first and second touch driving signals TS1 and TS2 may be synchronized with a first output voltage CPV1 having a first voltage level. The first and second touch driving signals TS1 and TS2 may be simultaneously supplied to the driving electrodes TE arranged in the first and second columns during the first period t1.

The touch driver 400 may supply touch driving signals to the driving electrodes TE arranged in the third to the sixth columns according to the multi-channel driving scheme during a second period t2. The display driver 400 may supply the third to sixth touch driving signals TS3, TS4, TS5 and TS6 to the driving electrodes TE arranged in the third to sixth columns, respectively, during the second period t2. The third to the sixth touch driving signals TS3, TS4, TS5 and TS6 may be synchronized with a second output voltage CPV2 having a second voltage level lower than the first voltage level. The third to sixth touch driving signals TS3, TS4, TS5 and TS6 may be simultaneously supplied to the driving electrodes TE arranged in the third to sixth columns during the second period t2.

The size of the unit sensing areas SUT directly adjacent to the hole HOL may be smaller than the size of the unit sensing areas SUT not adjacent to the hole HOL. Accordingly, the touch driver 400 may supply touch driving signals having the first voltage level to the driving electrodes TE directly adjacent to the hole HOL, and supply touch driving signals having the second voltage level lower than the first voltage level to the driving electrodes TE not adjacent to the hole HOL, so that touch sensitivity can be improved by uniformly adjusting the sensing signals of the unit sensing areas SUT.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A display device comprising:
a sensor area comprising a plurality of channels each comprising touch electrodes arranged in a column;
a peripheral area located around the sensor area and comprising touch lines connected to the channels; and
a display driver configured to supply touch driving signals to the channels,
wherein the sensor area comprises a first sensor area located at a first edge of the sensor area, and a second sensor area located adjacent to the first sensor area,
wherein the display driver supplies first touch driving signals having a first voltage level to the channels in the first sensor area during a first period, and supplies second touch driving signals having a second voltage level to the channels in the second sensor area during a second period after the first period, the second voltage level being lower than the first voltage level, and
wherein the display driver supplies the first touch driving signals sequentially to the channels in the first sensor area according to a single-channel driving scheme during the first period, and supplies the second touch driving signals simultaneously to the channels in the second sensor area according to a multi-channel driving scheme during the second period.

2. The display device of claim 1, wherein the sensor area has a circular or oval shape in a plan view.

3. The display device of claim 1, wherein the sensor area further comprises a third sensor area at a second edge of the sensor area, and
wherein the display driver supplies third touch driving signals having the first voltage level to the channels in the third sensor area according to the single-channel driving scheme during a third period after the second period.

4. The display device of claim 1, wherein a pulse width of each of the touch driving signals supplied during the first period is smaller than a pulse width of each of the touch driving signals supplied during the second period.

5. The display device of claim 1, wherein a size of some of the touch electrodes disposed in the first sensor area is smaller than a size of some of the touch electrodes disposed in the second sensor area.

6. The display device of claim 1, further comprising:
a voltage level output unit configured to determine the first voltage level or the second voltage level of the touch driving signals,
wherein the voltage level output unit comprises:
first and second charge pumps each comprising at least one capacitor;
a plurality of amplifiers associated with the plurality of channels, respectively;
a first switch disposed between the first and second charge pumps;
a second switch disposed between the second charge pump and the plurality of amplifiers; and
a third switch disposed between the first charge pump and the plurality of amplifiers.

7. The display device of claim 6, wherein the voltage level output unit outputs an output voltage of the first voltage level by connecting the first and second charge pumps in series by turning on the first and second switches.

8. The display device of claim 6, wherein the voltage level output unit outputs an output voltage of the second voltage level by connecting the first and second charge pumps in parallel by turning on the second and third switches.

9. The display device of claim 1, wherein the touch electrodes comprise a plurality of driving electrodes electrically connected in a first direction in the sensor area, and a plurality of sensing electrodes electrically connected in a second direction crossing the first direction in the sensor area, and
wherein the display driver supplies the touch driving signals to the plurality of driving electrodes and receives touch sensing signals from the plurality of sensing electrodes during a mutual capacitance period.

10. The display device of claim 9, wherein the display driver supplies the touch driving signals to the plurality of driving electrodes and receives the touch sensing signals from the plurality of driving electrodes during a first self-capacitance period after the mutual capacitance period.

11. The display device of claim 10, wherein the display driver supplies the touch driving signals to the plurality of sensing electrodes and receives the touch sensing signals from the plurality of sensing electrodes during a second self-capacitance period after the first self-capacitance period.

12. A display device comprising:
a sensor area comprising a plurality of channels each comprising touch electrodes arranged in a column, and a hole surrounded by some of the channels;
a peripheral area located around the sensor area and comprising touch lines connected to the channels; and
a display driver configured to supply touch driving signals to the channels,
wherein the display driver supplies first touch driving signals having a first voltage level to first channels that are directly adjacent to the hole during a first period, and supplies second touch driving signals having a second voltage level to second channels that are not adjacent to the hole during a second period after the first period, the second voltage level being lower than the first voltage level, and
wherein the display driver supplies the first touch driving signals sequentially to the first channels according to a single-channel driving scheme during the first period, and supplies the second touch driving signals simultaneously to the second channels according to a multi-channel driving scheme during the second period.

13. The display device of claim 12, wherein a pulse width of each of the first touch driving signals supplied during the first period is smaller than a pulse width of each of the second touch driving signals supplied during the second period.

14. The display device of claim 12, wherein a size of the touch electrodes directly adjacent to the hole is smaller than a size of the touch electrodes not adjacent to the hole.

15. The display device of claim 12, further comprising:
a voltage level output unit configured to determine the first voltage level or the second voltage level of the touch driving signals,
wherein the voltage level output unit comprises:
first and second charge pumps each comprising at least one capacitor;
a plurality of amplifiers associated with the plurality of channels, respectively;
a first switch disposed between the first and second charge pumps;

a second switch disposed between the second charge pump and the plurality of amplifiers; and a third switch disposed between the first charge pump and the plurality of amplifiers.

16. The display device of claim 15, wherein the voltage level output unit outputs an output voltage of the first voltage level by connecting the first and second charge pumps in series in case that the first and second switches are turned on.

17. The display device of claim 15, wherein the voltage level output unit outputs an output voltage of the second voltage level by connecting the first and second charge pumps in parallel in case that the second and third switches are turned on.

18. The display device of claim 12, wherein the touch electrodes comprise a plurality of driving electrodes electrically connected in a first direction in the sensor area, and a plurality of sensing electrodes electrically connected in a second direction crossing the first direction in the sensor area, and wherein the display driver supplies the touch driving signals to the plurality of driving electrodes and receives touch sensing signals from the plurality of sensing electrodes during a mutual capacitance period.

19. The display device of claim 18, wherein the display driver supplies the touch driving signals to the plurality of driving electrodes and receives the touch sensing signals from the plurality of driving electrodes during a first self-capacitance period after the mutual capacitance period.

20. The display device of claim 19, wherein the display driver supplies the touch driving signals to the plurality of sensing electrodes and receives the touch sensing signals from the plurality of sensing electrodes during a second self-capacitance period after the first self-capacitance period.

* * * * *